(12) United States Patent
Taguchi et al.

(10) Patent No.: US 7,708,336 B2
(45) Date of Patent: May 4, 2010

(54) CHASSIS FRAME AND METHOD OF MANUFACTURING CHASSIS FRAME

(75) Inventors: Fumikazu Taguchi, Kasaoka (JP); Kiyomi Kunihashi, Kasaoka (JP); Mitsuyori Gurita, Kasaoka (JP)

(73) Assignee: Hiruta-Kogyo Co., Ltd., Okayama (JP)

( * ) Notice: Subject to any disclaimer, the term of this patent is extended or adjusted under 35 U.S.C. 154(b) by 774 days.

(21) Appl. No.: 10/588,594

(22) PCT Filed: Feb. 17, 2004

(86) PCT No.: PCT/JP2004/001687

§ 371 (c)(1), (2), (4) Date: Aug. 7, 2006

(87) PCT Pub. No.: WO2005/077735

PCT Pub. Date: Aug. 25, 2005

(65) Prior Publication Data

US 2008/0315631 A1  Dec. 25, 2008

(51) Int. Cl.
*B60N 99/00* (2006.01)

(52) U.S. Cl. .................. 296/203.01; 296/205
(58) Field of Classification Search ............ 296/203.01, 296/203.02, 203.03, 203.04, 204, 205
See application file for complete search history.

(56) References Cited

FOREIGN PATENT DOCUMENTS

| JP | 2503341 | 4/1996 |
|----|---------|--------|
| JP | 10-338161 | 12/1998 |
| JP | 2000-203452 | 7/2000 |
| JP | 2002-120754 | 4/2002 |
| JP | 2002-178043 | 6/2002 |
| JP | 2003-285162 | 10/2003 |

*Primary Examiner*—Lori L Lyjak
(74) *Attorney, Agent, or Firm*—William L. Androlia; H. Henry Koda

(57) ABSTRACT

A cross-shaped chassis frame (1) formed by abutting and connecting the end parts of side members (12) to the outer face of a front end cross member (11), wherein the side members (12) are formed of hollow pipes, the end parts of the side members (12) are gradually expanded to form joined parts (20) expanded in flare skirt shape, and the outer edges of the joined parts (20) are allowed to abut on and welded to the outer face of the front end cross member (11), whereby the side members (12) can be jointed to the outer face of the front end cross member (11).

15 Claims, 25 Drawing Sheets

CHASSIS FRAME AND METHOD OF MANUFACTURING CHASSIS FRAME

BACKGROUND OF THE INVENTION

1. Field of the Invention

The present invention relates to a chassis frame formed by joining an end portion of a joining member in abutting contact with an outer face of a joined member, e.g., an octothorp-shaped chassis frame formed by joining an end portion of a side member in abutting contact with an outer face of an end cross member or by joining an end portion of a cross member in abutting contact with an outer face of a side member.

The "side members" defined in the present invention are a pair of symmetrical structural members extending in a direction of forward and backward movements of a vehicle. The "end cross member" is a structural member installed at a pair of joints formed at an each end portion of the side members in an orthogonal direction to the direction of forward and backward movements of the vehicle to form a front edge or a rear edge of the chassis frame, and it is exemplified as either a front end cross member or a rear end cross member. The "cross member" is a structural member installed between the side members in the orthogonal direction to the direction of forward and backward movements of the vehicle.

2. Description of the Related Art

A chassis frame which is a mount for an engine of an automobile or the like is formed into an octothorp shape by joining joints formed at an each end portion of side members in abutting contact with an outer face of a front end cross member or a rear end cross member, or by joining opposite ends of the cross member in abutting contact with outer faces of the side members, for example. In this chassis frame, not only rigidity of each member as a component but also joining strength and rigidity of each joined part between the respective members need to be enhanced. In order to enhance the joining strength and the rigidity of each joined part between the respective members, various techniques have been conventionally proposed.

There is a conventional art disclosed in Japanese Patent Application Laid-open No. 10-338161 in which "a brace of a half-cut horn shape" is attached to an end of a cross member particularly as a joined part to the cross member bridged between side members. It describes that rigidity of the frame can be enhanced by welding a bracket to the end of the cross member.

There is another conventional art disclosed in Japanese Patent Application Laid-open No. 2000-203452 in which the joined parts are individually formed by placing a bracket to a joint formed at each end portion of a side member bifurcated at a front end thereof. In the joined parts in this Japanese Patent Application Laid-open No. 2000-203452, the bracket has a function of accommodating the height difference caused by an uneven cross member and to thereby align a central axis of the cross member with a central axis of the side member.

Japanese Patent Application Laid-open No. 2002-120754 designs to enhance rigidity of a joined part. At the joined part of this conventional art, a flange is formed at each end portion of a cross member formed by combining and joining two members having angular U cross-sectional shapes, and a side member is arc-welded to the flange. The side member is not provided with a hole for attaching a cross member. Cross member reinforcements are attached respectively from right and left sides so as to sandwich the joined part between both the side member and the cross member, and the cross member reinforcements and both the members are joined by all around arc-welding. In this way, not only rigidity of the joined part but also flexural rigidity and torsional rigidity of the whole chassis frame are enhanced.

A case in which a joint formed at an end portion of a side member is joined in abutting contact with an outer face of a front end cross member will be described below as an example.

In each of the above-described conventional arts, an additional auxiliary member is attached to a joint formed at an end portion of a side member to enhance joining strength and rigidity of the joined part. It is true that the joining strength or rigidity is enhanced by attaching the auxiliary member, but increase in number of members results in increase in number of process steps and cost of manufacturing.

Therefore, a joined part formed without using such auxiliary member is also frequently used. Such a joined part is formed by cutting a joint at an end portion of a side member with a laser or the like so that the joint has a shape following a pattern of an outer face of a front end cross member and bringing this joint into close contact with the outer face of the front end cross member. However, such cutting process of the joint formed at the end portion of the side member increases machining cost due to use of the laser and to secure high dimensional accuracy. Moreover, to weld a joint between members intersecting with each other at acute angles is of poor durability.

In view of above, therefore, the inventors of the present invention have studied to develop a chassis frame including a joined part which can be formed without using an auxiliary member so as to reduce number of members and without cutting process by using a laser while achieving high joining strength and rigidity.

SUMMARY OF THE INVENTION

According to the present invention, there is provided an octothorp-shaped chassis frame formed by joining an end portion of a joining member in abutting contact with an outer face of a joined member, wherein the joining member is formed of a hollow pipe, the end portion of the joining member is gradually expanded to form a joint expanded in a flared skirt shape, and an outer edge of the joint is brought into contact with and welded to the outer face of the joined member to join the joining member to the outer face of the joined member.

Specifically, in a case of that the joining member is a side member and the joined member is an end cross member, the end portion of the side member as being a hollow pipe is gradually expanded toward the outer face of the end cross member to form the joint expanded in the flared skirt shape, the outer edge of the joint is brought into contact with the outer face of the end cross member, and the outer edge of the joint is welded to the outer face of the end cross member. On the other hand, in a case of that the joining member is a cross member and the joined member is a side member, the end portion of the cross member as being a hollow pipe is gradually expanded toward the outer face of the side member to form the joint expanded in the flared skirt shape, the outer edge of the joint is brought into contact with the outer face of the side member, and the outer edge of the joint is welded to the outer face of the side member.

An outside shape of the joint is dependent on respective shapes or size relations of the joining member and the joined member. If both the joining member and joined member are formed of pipes having circular sectional shapes, the outer edge of the joint is substantially in a circular arc shape following a pattern of the outer face of the joined member in a side view. On the other hand, if the joining member is a pipe having a circular sectional shape and the joined member is a pipe having a rectangular sectional shape, the outer edge of the joint is substantially in a linear shape following the pattern of the outer face of the joined member in a side view. Since the joint has the outer edge of the shape following the pattern of the outer face of the joined member, positioning of the joining member with respect to the joined member becomes easier and an assembled state can be maintained easily during welding operation.

If the joining member and the joined member are identical in size, the joint can be widely expanded in the extending direction of the joined member, while the joint can be expanded only up to the size of the joined member in the orthogonal direction to the extending direction of the joined member. If the joined member is smaller than the joining member, the joint gets narrower in the orthogonal direction to the extending direction of the joined member. Therefore, if the size of the joining member is greater than or identical to the joined member, it is advisable that the joint has an outer edge in a side view in a shape following the pattern of the outer face of the joined member and the outer edge in a front view in an elliptic shape having a major axis in an extending direction of the joined member and a minor axis in an orthogonal direction to the extending direction of the joined member. In other words, the joint is formed in a shape protruding toward the joined member while expanded in the extending direction of the joined member and hardly expanded in the orthogonal direction to the extending direction of the joined member. Therefore, it is advisable that the elliptic shape as a front view of the joint is formed by a minor axis substantially identical to the size of the joined member and a major axis 1.2 to 2.5 times, preferably 1.5 to 2.0 times of the joining member. For example, in a case of that the joining member is a pipe having a circular sectional shape of an outer diameter of Da and the joined member is a pipe having a circular sectional shape of an outer diameter of Db, the elliptic shape as a front view of the joint has a minor axis of Db and a major axis of 1.2×Da to 2.5×Da, preferably 1.5×Da to 2.0×Da.

Reversely, if the joining member is smaller than the joined member, it is advisable that the joint has an outer edge in a side view in a shape following the pattern of the outer face of the joined member and the outer edge in a front view in a cross shape extending respectively in an extending direction and in an orthogonal direction to the extending direction of the joined member. The cross shape is formed by enlarging the joint in the above-described elliptic shape especially in the orthogonal direction to the extending direction of the joined member to adapt to the size of the joined member.

If the joint has the cross shape in the front view, it is advisable that a length of the cross in the extending direction of the joined member is 1.2 to 2.5 times, preferably 1.5 to 2.0 times of the joining member and a length of the cross in the orthogonal direction to the extending direction of the joined member is between the size of the joining member and the size of the joined member. For example, if the joining member is a pipe having a circular sectional shape of an outer diameter of Da and the joined member is a pipe having a circular sectional shape of an outer diameter of Db, in a case where Db=1.5×Da, the cross shape as a front view of the joining member has a length of 1.2×Da to 2.5×Da, preferably 1.5×Da to 2.0×Da in the extending direction of the joined member and a length in a range of Da to Db=1.5×Da in the orthogonal direction to the extending direction of the joined member.

The joint expands an effective joining cross-sectional area for supporting the joining member whereby the joining strength and rigidity are enhanced. In the above-described example, the joining cross-sectional area of the joint having the elliptic shape in the front view is expanded by 1.2×Db/Da to 2.5×Db/Da times, preferably 1.5×Db/Da to 2.0×Db/Da times. In the joint having the cross shape in the front view, the joining cross-sectional area is further expanded since it is expanded in the orthogonal direction to the extending direction of the joined member wider than that of the aforementioned elliptic shape.

The joint has a function of smoothly transferring a load from the joining member to the expanded joining cross-sectional area. For this purpose, the joint is formed of a flared-skirt-shaped curved face, i.e., the curved face contiguous with the outer face of the joining member. The curved face is a three-dimensional curved face having a shape of which is depending on the shapes and sizes of the joining member and the joined member. The curved face forming the joint in a relationship with the elliptic shape or the cross shape in the front view is desirably formed in a range of 0.5×Da to 1.5×Da, preferably 0.6×Da to 1.2×Da from the end face of the joining member formed of a tubular pipe having an outer diameter Da.

It is desirable that the joint is symmetric respectively in an extending direction and in an orthogonal direction to the extending direction of the joined member with respect to an axial direction of the joining member, so that stress is evenly distributed in a peripheral direction of the joint. If the joint is symmetric respectively in the extending direction and in the orthogonal direction to the extending direction of the joined member with respect to the axial direction of the joining member, the elliptic shape or the cross shape as the front view of the outer edge is symmetric and the curved face contiguous from the outer face to the outer edge of the joining member is symmetric. For example, in the joint having elliptic shape in the front view, if a center (a center of gravity) of the ellipse agrees with the axis of the joining member, the joint is symmetric in the extending direction and in the orthogonal direction to the extending direction of the joined member with respect to the axial direction of the joining member. Correspondingly, in the joint having the cross shape in the front view, if midpoints in the extending direction and in the orthogonal direction to the extending direction of the joined member agree with each other and if the midpoints agree with the axis of the joining member, the joint is symmetric in the extending direction and in the orthogonal direction to the extending direction of the joined member with respect to the axial direction of the joining member.

The joining member can be enhanced its joining strength and rigidity more effective where the joining member is joined with the outer edge of the joint in abutting contact with the outer face of the joined member to be orthogonal to the outer face in a plan view and a side view, i.e., where the joining member and the joined member are arranged in a same plane and the joining member is joined to the joined member to be orthogonal to the joined member. If the joining member is orthogonal to the joined member in the plan view or in the side view, the joining strength and rigidity of the joining member with respect to the joined member can be enhanced. In other words, if the joining member is joined in abutting contact with the outer face of the joined member to be oblique with respect to the outer face in a plan view or if the joining member is joined in abutting contact with the outer face of the joined member to be oblique with respect to the outer face in a side view, the joining strength and rigidity of the joining member with respect to the joined member can be increased.

The chassis frame is soaked in tanks of paint and rustproofing treatment liquid for painting and rustproofing treatment after joining the side members, the end cross member, and the cross member. At this time, if the respective joints are closed completely, there is a possibility that the paint and the rustproofing treatment liquid remain in the respective members. In this case, it is advisable that each joint is provided with a swelling rib forming a groove recessed from the outer face of the joined member. The swelling rib is a localized swelling on a curved face extending to the outer edge of the joint. The joint is joined by welding the outer edge in contact with the outer face of the joined member excluding the swelling ribs. As a result, the paint and rustproofing liquid entering in the chassis frame, especially into the joining member, can be discharged through the recessed grooves formed by the swelling ribs. Therefore, the recessed grooves formed by the swelling ribs can provide discharge paths for discharging sand, gravel, and water which are entered to the chassis frame. Besides, the swelling ribs also function as reinforcing ribs for making a sectional shape of each joint complex to thereby enhance structural strength of the joint itself.

Size, sectional shape, or numbers of the swelling rib can be freely arranged. For example, if only for the purpose of discharging the paint or the rustproofing treatment liquid, one small swelling rib may be provided to the joint. For focusing on the function of the swelling rib as a reinforcing rib, a plurality of swelling ribs may be provided to the joint. In this case, because increase in number or size of swelling ribs reduces a length of the outer edge of the joint to be welded to the outer face of the joined member, it fixes size, sectional shape, or number of swelling ribs in such a range as not to reduce the joining strength or rigidity. Furthermore, in order to prevent uneven distribution of the stress on the joint, it is desirable that the swelling ribs are arranged on the joint evenly in a peripheral direction of the joint. Even in that case, however, the swelling ribs may be arranged unevenly if, for example, another member of the chassis frame and the swelling rib interfere with each other.

The chassis frame according to the present invention is manufactured in the following manufacturing method. That is, the chassis frame is manufactured in a method of manufacturing an octothorp-shaped chassis frame formed by joining an end portion of a joining member formed of a hollow pipe in abutting contact with an outer face of a joined member, wherein the joining member joins to the outer face of the joined member by welding an outer edge of a flared-skirt-shaped joint formed at the end portion of the joining member by bringing into contact with the outer face of the joined member; the flared-skirt-shaped joint formed at the end portion of the joining member is formed, using a forming punch comprising a base portion having a surface following a pattern of the outer face of the joined member, and a flared-skirt-shaped protruding portion protruding from the base portion in a protruding direction aligned with a direction in which the joining member joins to the joined member, by pushing the flared-skirt-shaped protruding portion of the forming punch into the end portion of the position-fixed joining member by aligning the protruding direction of the flared-skirt-shaped protruding portion with an axial direction of the joining member, to expand the end portion of the joining member by the flared-skirt-shaped protruding portion. The protruding portion of the forming punch may be pushed into until the outer edge of the end portion of the joining member comes in contact with the base portion.

The forming punch used for the above manufacturing method may include a protruding portion substantially in a truncated cone shape formed of an upper end face in a shape identical to an inside shape of the joining member, a lower end face having an outer edge in a side view having a shape following a pattern of the surface of the base portion which follows the outer face of the joined member and the outer edge in a front view in an elliptic shape having a major axis in an extending direction of the joined member and a minor axis in the orthogonal direction to the extending direction of the joined member, and a curved face connecting the upper end face and the lower end face. The joint formed by this forming punch comprises an outer edge in a shape following a pattern of the outer face of the joined member in a side view, and in an elliptic shape having a major axis in an extending direction of the joined member and a minor axis in the orthogonal direction to the extending direction of the joined member in a front view. The forming punch is suitable in a case where the joined member is identical to or smaller than the joining member in size.

Alternatively, the forming punch used for the above manufacturing method may include a protruding portion substantially in a truncated cone shape formed of an upper end face in a shape identical to an inside shape of the joining member, a lower end face having an outer edge in a side view having a shape following a pattern of the surface of the base portion which follows the outer face of the joined member and the outer edge in a front view having a cross shape extending respectively in an extending direction and in an orthogonal direction to the extending direction of the joined member, and a curved face connecting the upper end face and the lower end face. The joint formed by this forming punch comprises an outer edge in a shape following a pattern of the outer face of the joined member in a side view, and in a cross shape extending respectively in an extending direction of the joined member and in an orthogonal direction to the extending direction of the joined member in a front view. The forming punch is suitable in a case where the joined member is larger than the joining member.

DESCRIPTION OF THE PREFERRED EMBODIMENTS

Figure 1:
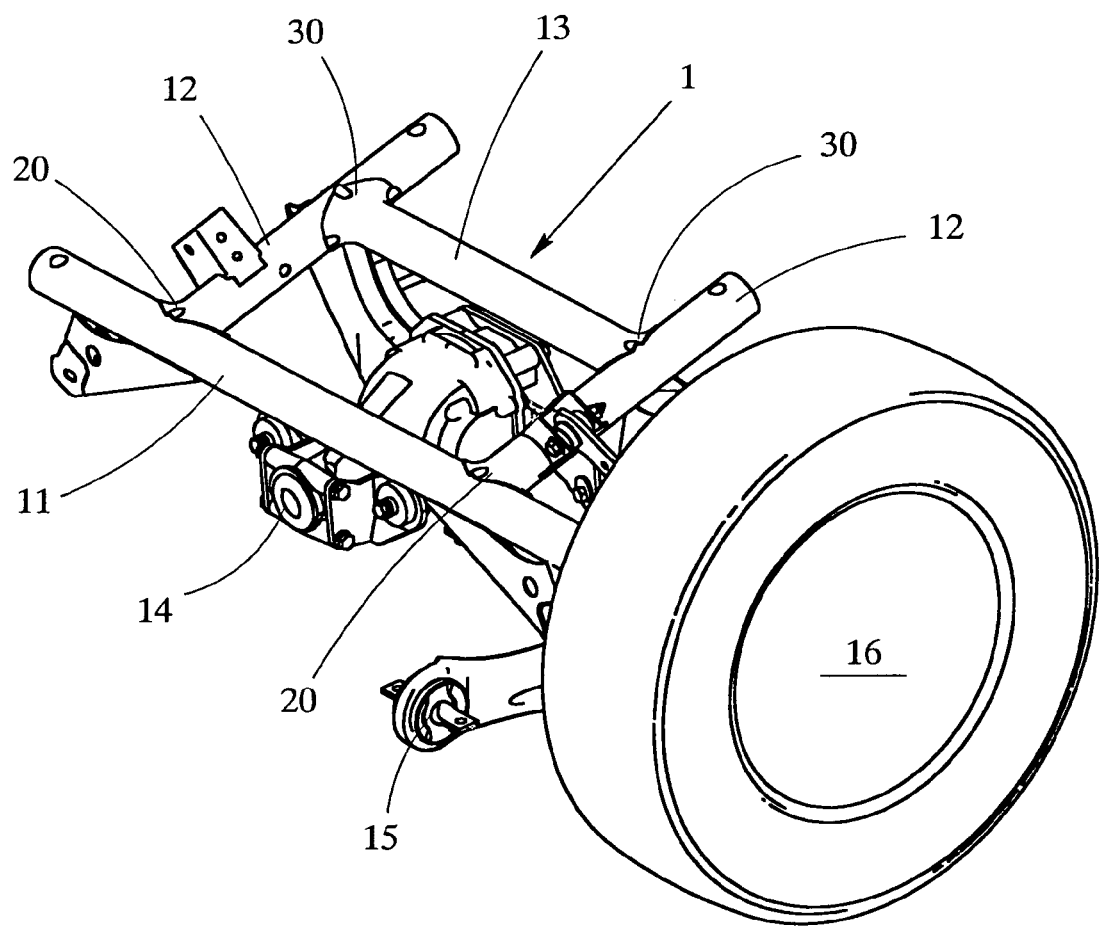
FIG. 1 is a perspective view of an example of a chassis frame to which the present invention is applied.

Embodiments of the present invention will be described while referring to the drawings. As a matter of convenience for description, welding marks on outer edges of joints 20, 30 are not shown in the respective drawings.

Figure 2:
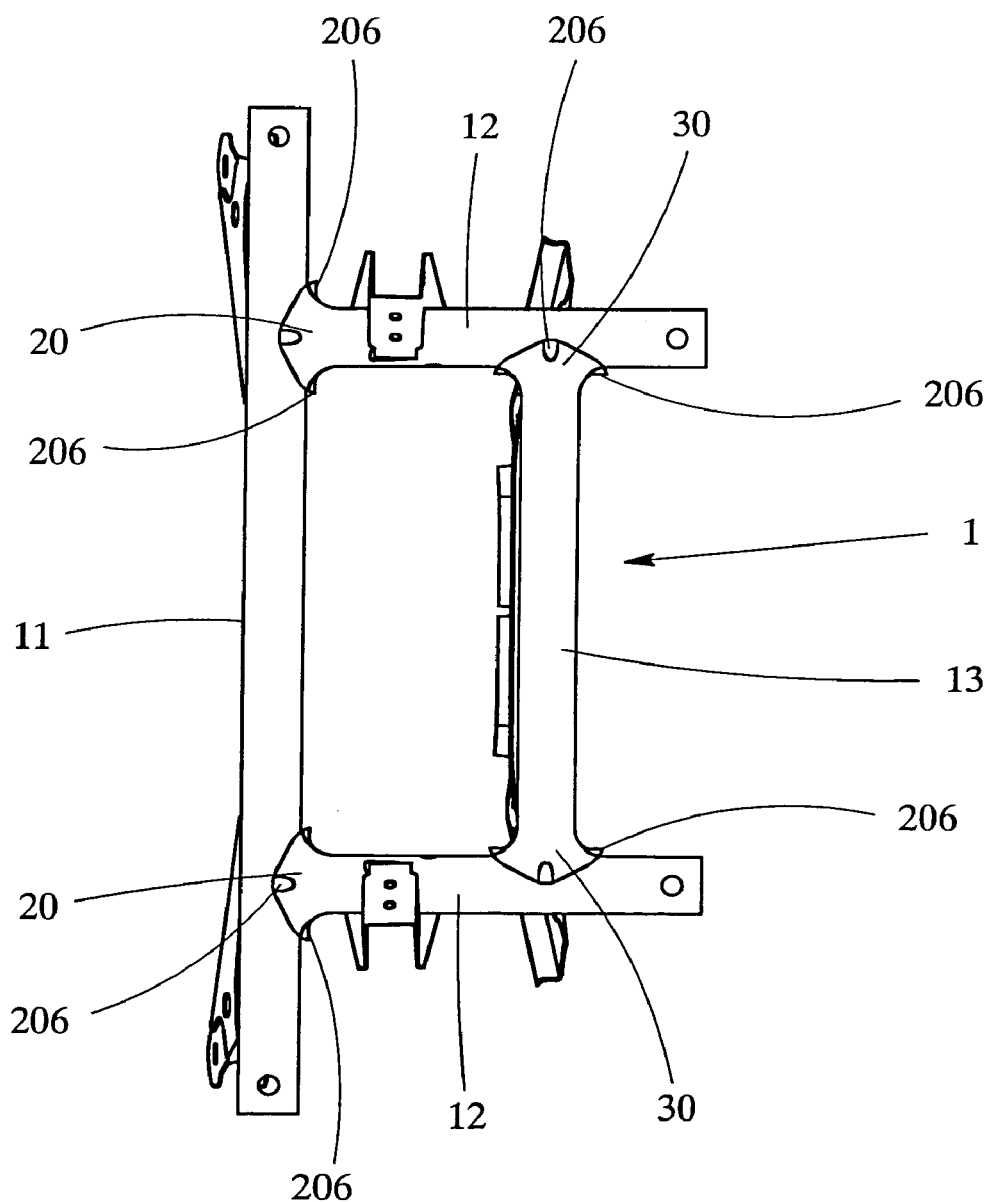
FIG. 2 is a plan view of the chassis frame shown in FIG. 1.

As shown in FIGS. 1 and 2, a chassis frame 1 has a structure in which a front end cross member 11, side members 12, 12, and a cross member 13 are assembled into an octothorp shape. The chassis frame 1 functions as a mount for mounting an engine 14, and mounts wheels 16 through suspension systems 15. For these purposes, the front end cross member 11, the side members 12, and the cross member 13 are respectively provided with flanges and formed with mounting holes. In the chassis frame 1 of this embodiment, the joints 20, 30 respectively expanded into flared skirt shapes are formed at front end portions of the side members 12 joined to an outer face 111 of the front end cross member 11 and at both end portions of the cross member 13 installed between the side members 12, 12.

The side member 12 and the front end cross member 11 are also called respectively as a joining member and a joined member, hereinafter. The joint 20 formed at the end portion of a side member 12 will be described below as an example.

Figure 3:
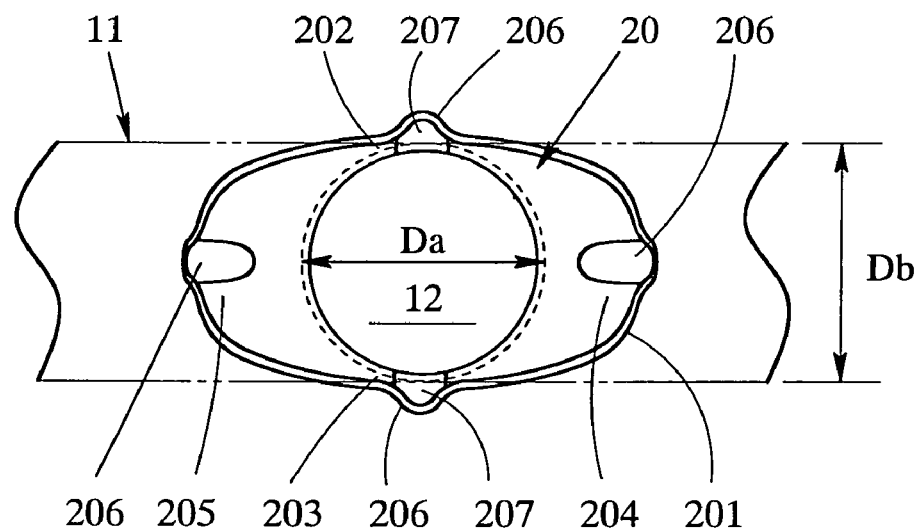
FIG. 3 is a front view of a joint formed at an end portion of a side member and including swelling ribs.
Figure 4:
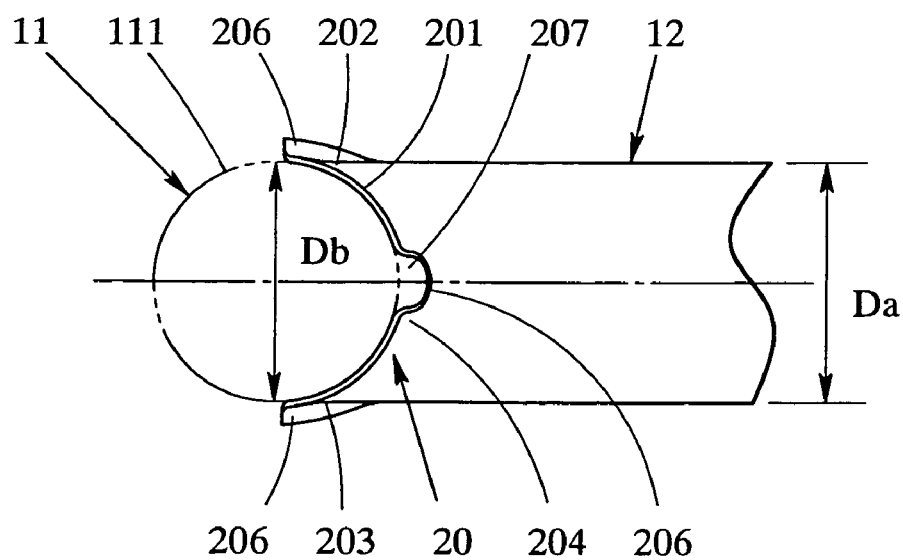
FIG. 4 is a side view of the joint shown in FIG. 3.
Figure 5:
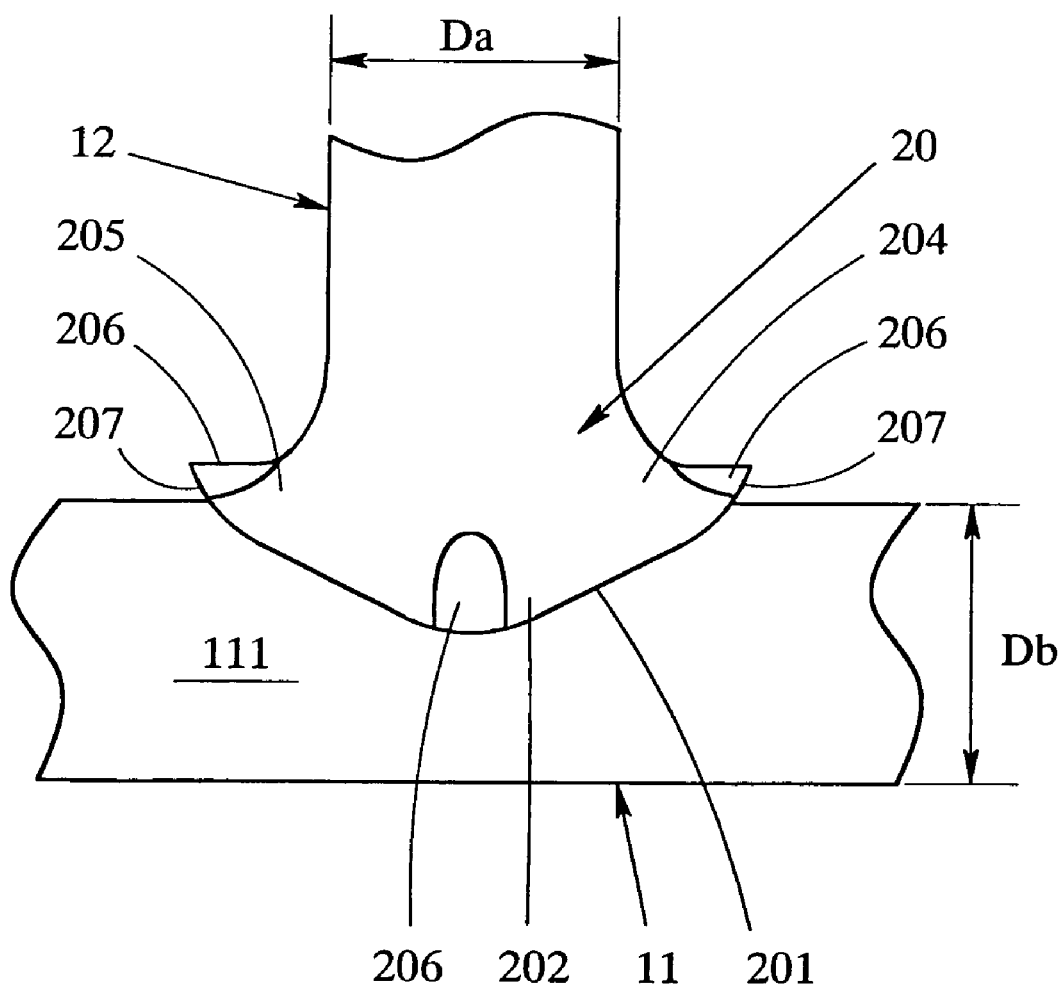
FIG. 5 is a plan view of the joint shown in FIG. 3.

As shown in FIGS. 3 to 5, the joint 20 formed at the end portion of the side member 12 is gradually expanded toward the outer face 111 of the front end cross member 11 to form the flared skirt shape. In this embodiment, since the side member 12 and the front end cross member 11 are circular sectional tube pipes having an identical diameter, an outer edge 201 of the joint 20 has a substantially circular arc shape in a shape following a pattern of the outer face 111 of the front end cross member 11 in a side view and has an elliptic shape in a front view. As a matter of convenience for description, expanded portions in a vertical direction of the joint 20 are referred to as an upper flange 202 and a lower flange 203, and expanded portions in a lateral direction are referred to as a left flange 204 and a right flange 205. The upper flange 202 and the lower flange 203 have identical lengths and the left flange 204 and the right flange 205 have identical lengths, and the elliptic shape as the front view of the joint 20 has a shape formed by connecting the respective flanges 202, 203, 204, and 205 with radially protruding arcs. In the chassis frame 1 of this embodiment, the joint 20 formed by aligning a center of the elliptic shape with an axis of the side member 12 is joined by welding in abutting contact with the outer face 111 of the front end cross member 11 to be orthogonal to the outer face 111 in both front and side views.

The joint 20 of this embodiment has the elliptic shape in the front view with a minor axis in an orthogonal direction to the extending direction of the front end cross member 11 being substantially identical to an outer diameter Db of the front end cross member 11 and a major axis in the extending direction of the front end cross member 11 being 1.8 times of an outer diameter Da of the side member 12. In this embodiment, since the front end cross member 11 and the side member 12 have the identical diameter, a joining cross-sectional area formed by the outer edge 201 of the joint 20 is approximately 1.8 times of a cross-sectional area of the side member 12. The joint 20 is formed in a range of a distance of 1.25×Da or shorter from an end face of the side member 12. Since the left flange 204 and the right flange 205 extend in the extending direction of the front end cross member 11, the upper flange 202 and the lower flange 203 are 1.25×Da or shorter, and the left flange 204 and the right flange 205 are 0.75×Da or shorter. A curvature radius R of a curved face of this joint 20 becomes the maximum at the left flange 204 and the right flange 205, and is about 0.75×Da in this embodiment.

Figure 6:
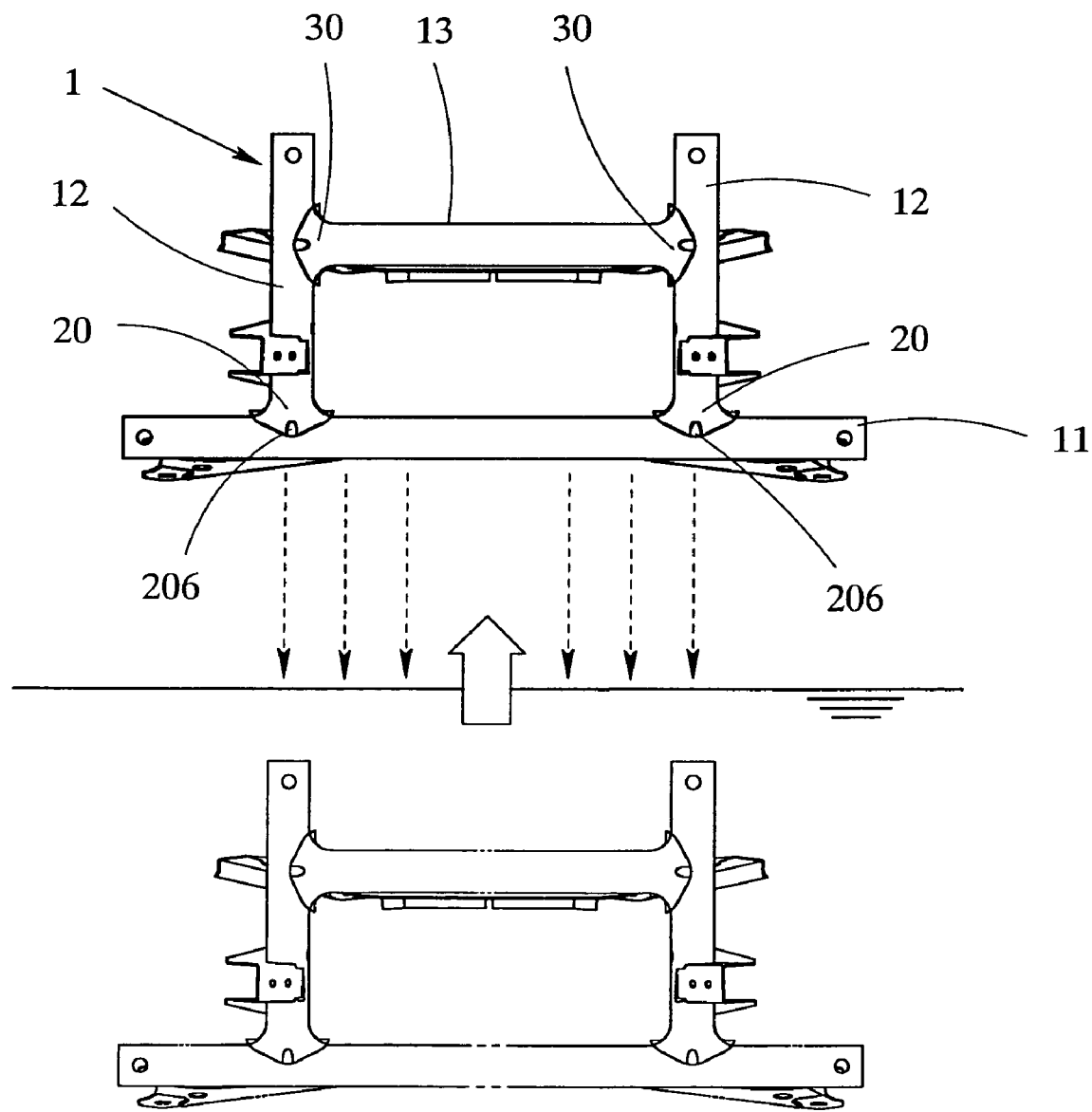
FIG. 6 is a schematic diagram showing a state of painting treatment or rustproofing treatment of the chassis frame in which the joints are formed.

The joint 20 of this embodiment is provided with four swelling ribs 206 respectively forming recessed grooves 207 with respect to the outer face 111 of the front end cross member 11 at substantially even intervals in a circumferential direction at the upper flange 202, the lower flange 203, the left flange 204, and the right flange 205. As a result, the recessed groove 207 being communicate with the external from a closed space formed by the outer face 111 of the front end cross member 11 and the joint 20 is formed. Accordingly, as shown in FIG. 6, paint or rustproofing treatment liquid which have entered to the chassis frame 1 can be discharged from the recessed grooves 207 formed at the joint 20. Moreover, the swelling ribs 206 also function as reinforcing ribs for the joint 20.

Figure 7:
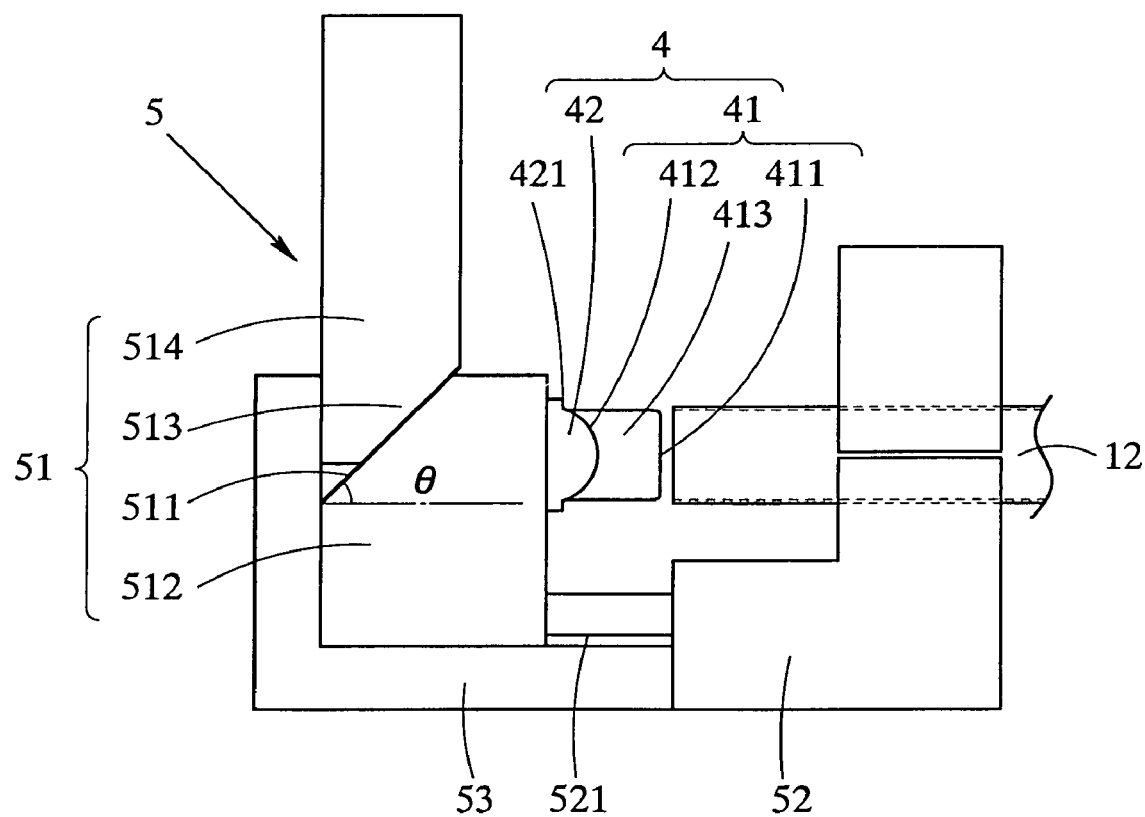
FIG. 7 is a side view of a forming device before forming a joint at the end portion of the side member.
Figure 8:
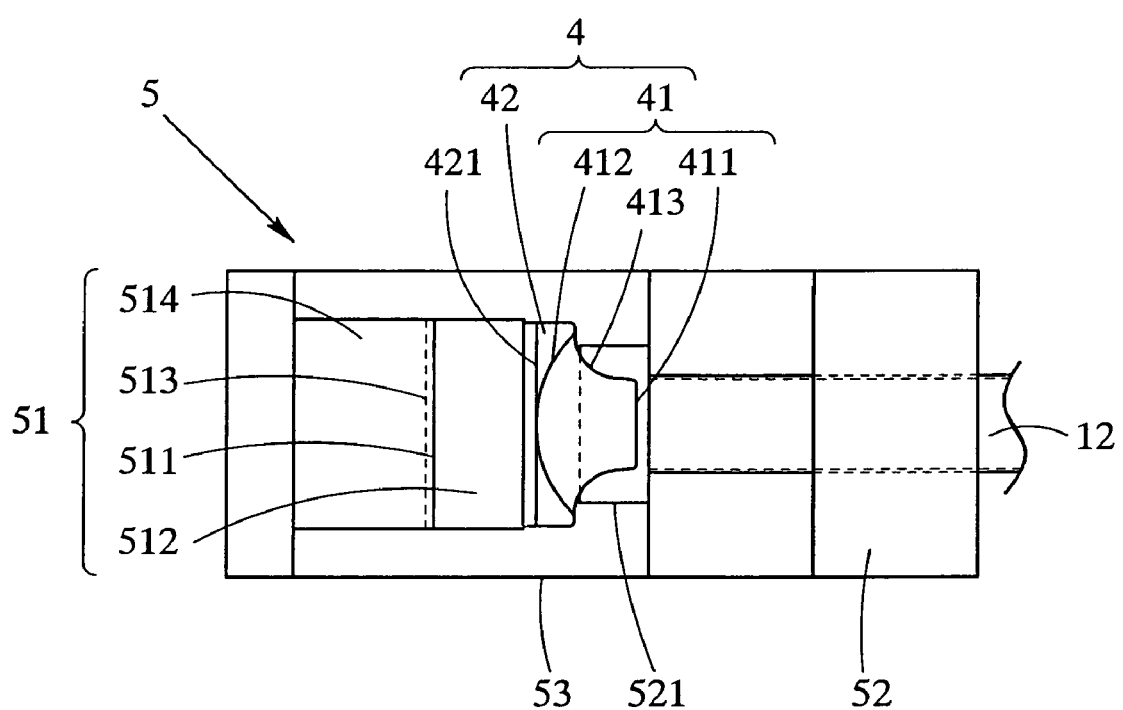
FIG. 8 is a plan view of the forming device before forming a joint at the end portion of the side member.

For forming the joint, various methods or devices can be used. In this embodiment, a forming device 5 shown in FIGS. 7 and 8 is used to form the joint. In the forming device 5 of this embodiment, a machining portion 51 for moving a forming punch 4 forward or backward, and a clamp portion 52 for clamping and holding the side member 12 with the end portion of the side member 12 facing the machining portion 51 are provided on a base 53.

The machining portion 51 comprises a pressed slope 511, a cam slider 512 for sliding forward to or backward away from the clamp portion 52 on the base 53, and a cam driver 514 for moving a pressing slope 513 up and down to the pressed slope 511 of the cam slider 512. The forming punch 4 is mounted on an opposite side of the pressed slope 511 of the cam slider 512 with a protruding portion 41 facing the side member 12 held by the clamp portion 52. The cam slider 512 moves toward the clamp portion 52 to insert the protruding portion 41 of the forming punch 4 into the end portion of the side member 12 held by the clamp portion 52, since the pressing slope 513 of the cam driver 514 moves down and presses the pressed slope 511.

The forming punch 4 comprises a base portion 42 having a surface following a pattern of the outer face 111 of the front end cross member 11 and a protruding portion 41 having a flared-skirt-shape protruding from the base portion 42 in a protruding direction aligned with a joining direction of the side member 12 to the front end cross member 11. The protruding portion 41 is substantially in a truncated cone shape formed of a circular upper end face 411 having a diameter identical to the inner diameter of the side member 12, a lower end face 412 having a shape in a side view following a pattern of a surface of the base portion 42 which follows a shape of the outer face 111 of the front end cross member 11 and having an elliptic shape in a front view having a major axis in the extending direction of the front end cross member 11 and a minor axis in an orthogonal direction to the extending direction of the front end cross member 11, and a curved face 413 contiguously connecting the upper end face 411 and the lower end face 412. The base portion 42 and the protruding portion 41 of the forming punch 4 in this embodiment are a product integrally made of metal. The base portion 42 is provided with a step 421 contacted with the outer edge 201 of the joint 20 formed by expanding the end portion of the side member 12 by plastic deformation so as to restrict expansion of the joint 20. In addition thereto, a tip end of the protruding portion 41 is chamfered so as to assist with insertion of the protruding portion 41 into the end portion of the side member 12.

Furthermore, in the forming device 5 of the embodiment, a returning portion 521 compressed by the cam slider 512 moving forward to the clamp portion 52 is provided to the clamp portion 52 so as to push the cam slider 512 back to a default position after the pressed slope 511 is released from pressure as the cam driver 514 moves up. It is essential to the returning portion 521 that resilience is generated utilizing elastic deformation thereof compressed by the cam slider 512. It can be exemplified with a rubber block, a coil spring and the like.

Figure 9:
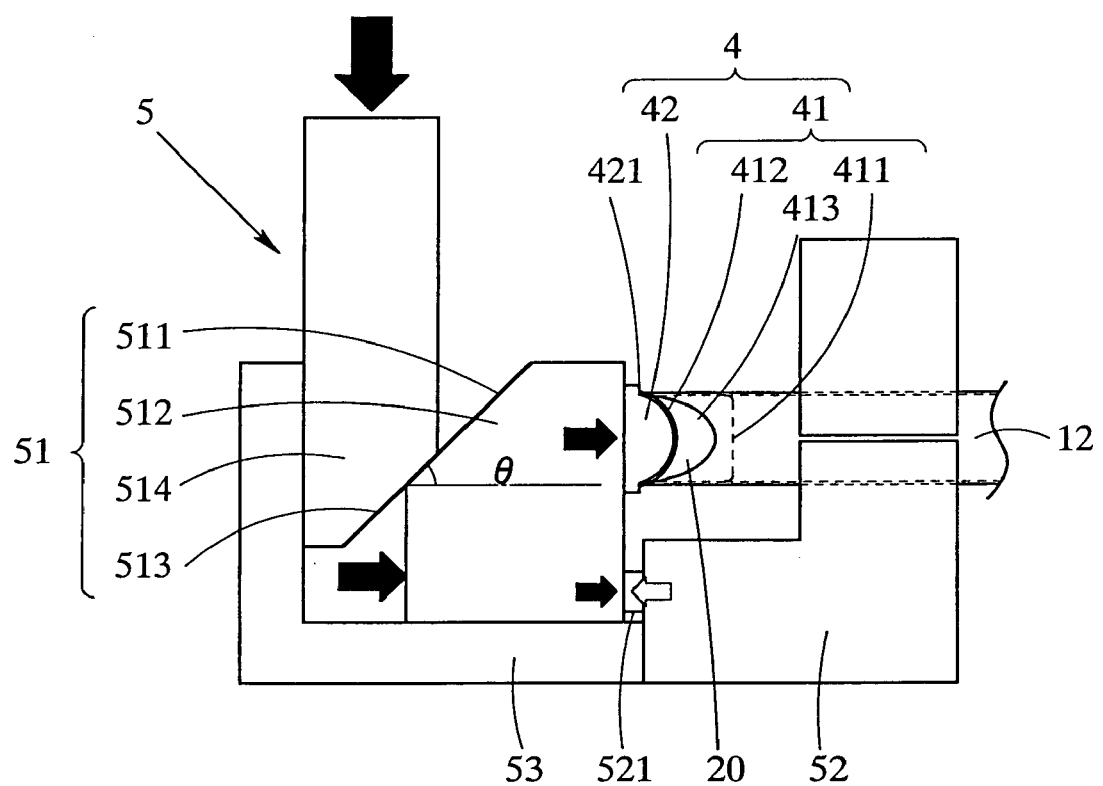
FIG. 9 is a side view of the forming device after forming the joint at the end portion of the side member.
Figure 10:
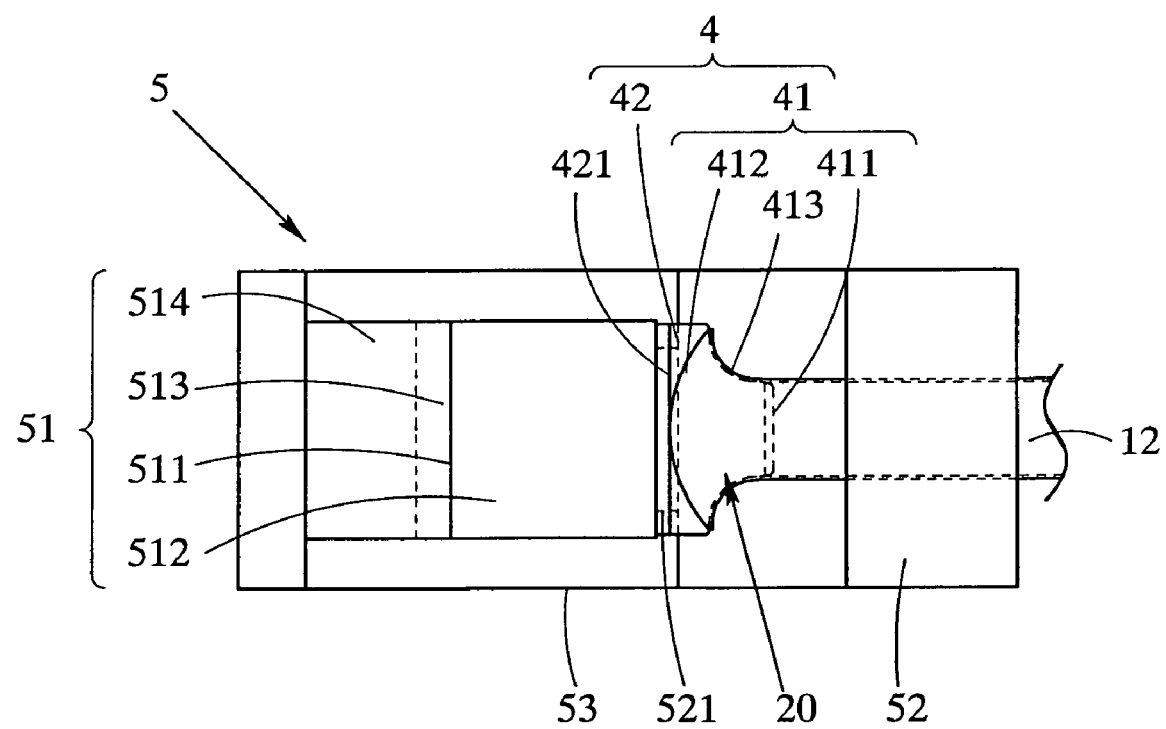
FIG. 10 is a plan view of the forming device after forming the joint at the end portion of the side member.

A specific forming procedure of the joint 20 is as follows. After the side member 12 is clamped and held by the clamp portion 52 and then the cam driver 514 is moved down, the pressing slope 513 of the cam driver 514 presses the pressed slope 511 of the cam slider 512 as shown in FIGS. 9 and 10. At this time, the cam slider 512 is restricted to move downward by the base 53, and therefore the cam slider 512 approaches the side member 12 held by the clamp portion 52 at an amount of downward movement of the cam driver 514× cos θ (cosine of an inclination θ of the pressed slope). Then, the protruding portion 41 of the forming punch 4 is inserted from the end portion of the side member 12 to expand the end portion by plastic deformation such that the end portion follows an outer shape of the protruding portion 41. Pressing force of the protruding portion is pressing force of the cam driver 514×cos θ (cosine of an inclination θ of the pressed slope). When the outer edge 201 of the formed joint 20 comes in contact with the step 421 provided at the base portion 42 of the forming punch 4, the forming operation is completed. The swelling ribs may be formed not only by the forming punch in parallel with forming of the joint, but also by the other process performed after the joint formed.

After the forming, when the cam driver 514 is moved up, the cam slider 512 is pushed back by the resiliency of the elastically deformed returning portion 521 so that the protruding portion 41 of the forming punch 4 can automatically be withdrawn from the joint 20 formed at the end portion of the side member 12. The side member 12 is detached from the clamp portion 52 after the protruding portion 41 is separated from the joint 20. With the forming device 5 of the present example, by only changing the forming punch 4, it is possible to easily form any type of joint at each end portion of side members, front end cross members, and cross members of which they have different sizes or shapes.

As described above, the forming punch 4 makes the joint 20 possible to be freely arranged with variety of its shapes and to be easily formed. The joint has not only a function of enhancing joining strength of the joining member to the joined member but also a function as an adaptor that accommodates a difference in abutting direction and angle of the joining member with the joined member and that accommodates a difference in size and shape between the joining member and the joined member. Then, by focusing on the function of the joint as the adaptor, various modes of the present invention will be described by taking a case where the side member 12 is joined to the front end cross member 11, as an example similarly to the above example. Although the swelling ribs at the joint are not shown in the following respective drawings for convenience in explanation, the swelling ribs may be provided as respective as required.

Figure 11:
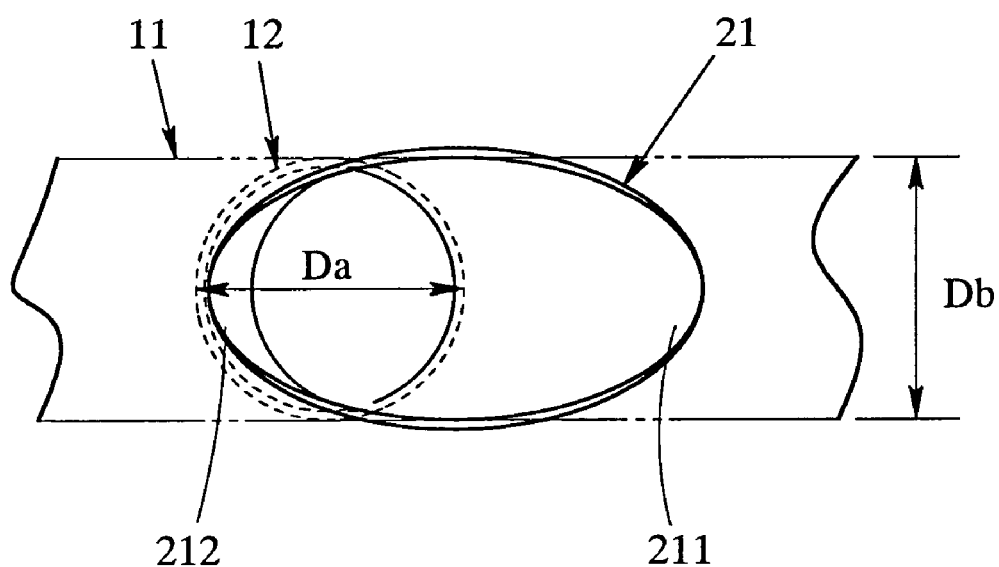
FIG. 11 is a front view of a joint formed at an end portion of a side member obliquely joined to a front end cross member.
Figure 12:
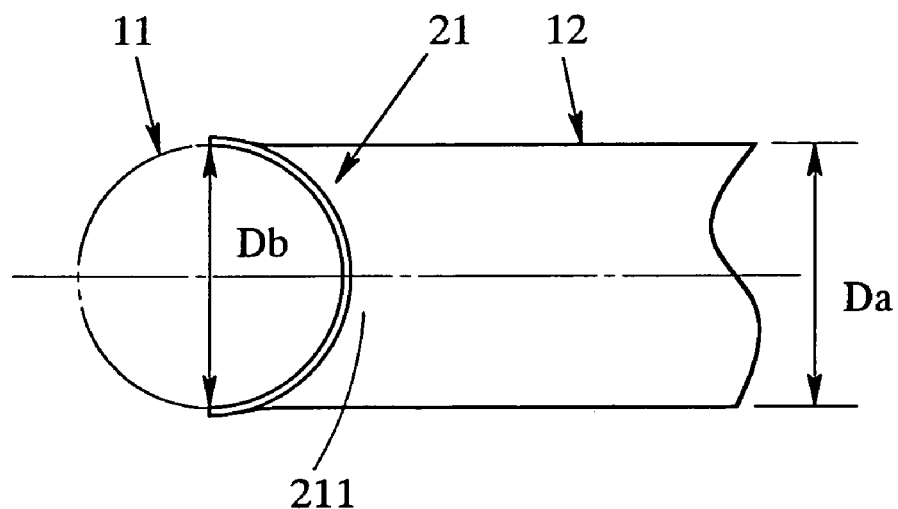
FIG. 12 is a side view of the joint shown in FIG. 11.
Figure 13:
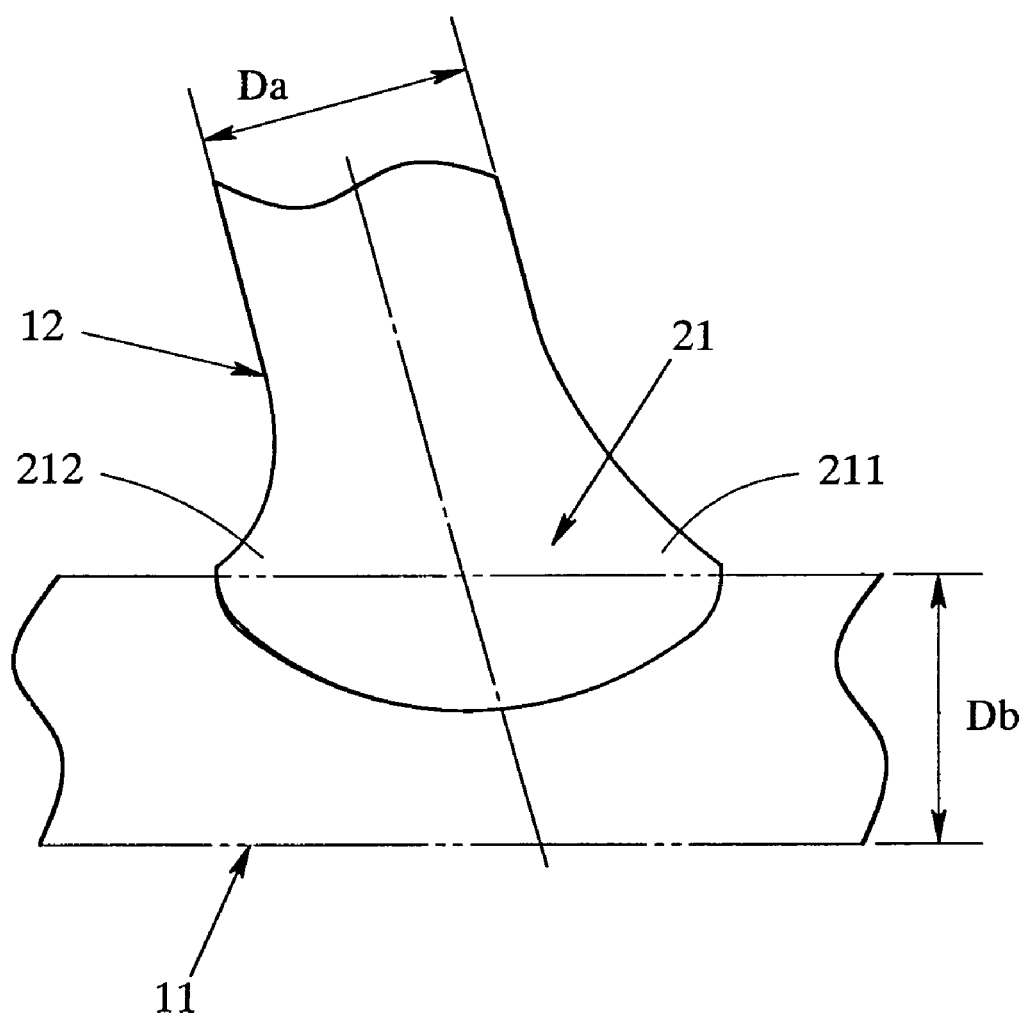
FIG. 13 is a plan view of the joint shown in FIG. 12.

In a case of that the side member 12 is joined in abutting contact with the front end cross member 11 from an oblique direction in a plan view, as shown in FIGS. 11 to 13, the side member 12 may be inclined through a joint 21. While the joint 21 of the present example is symmetrically provided with a left flange 211 and a right flange 212, it is also conceivable that the joint 21 is asymmetrically provided with the left flange and the right flange to thereby prevent or suppress inclination of the side members when the side member is inclined steeply, for example. Although a relationship between the left flange 211 and the right flange 212 is described in the embodiment, the above description holds true also for a relationship between an upper flange and a lower flange when the side member is joined in abutting contact with the front end cross member from an oblique direction in a side view.

Difference in size between the side member and the front end cross member can also be accommodated by the shape of the joint.

Figure 14:
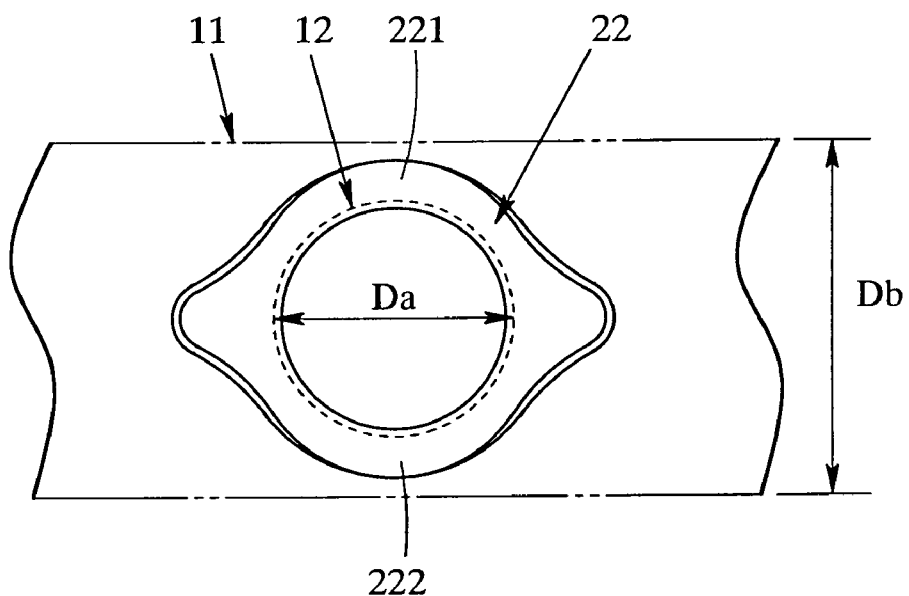
FIG. 14 is a front view showing a joint formed at an end portion of a side member joined to an outer face of a relatively large front end cross member.
Figure 15:
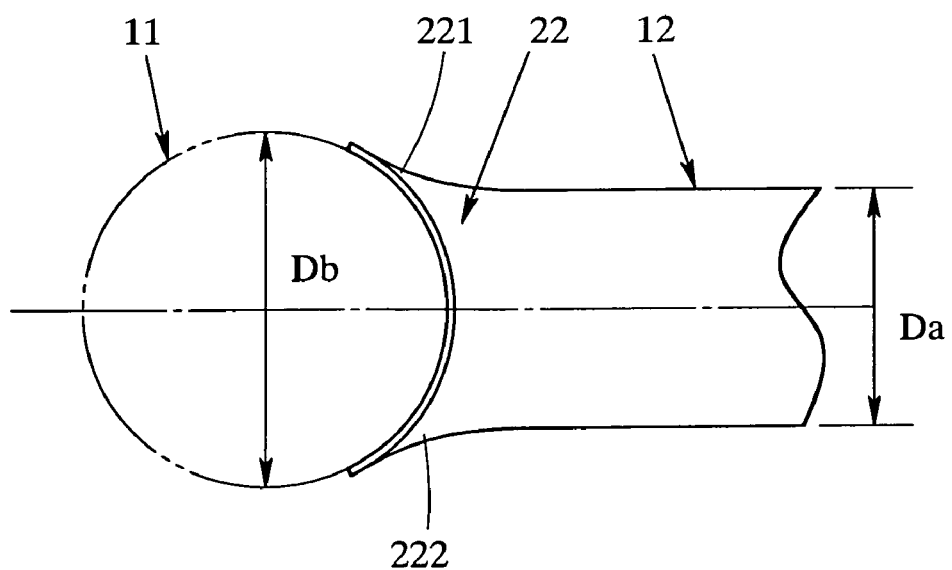
FIG. 15 is a side view of the joint shown in FIG. 14.
Figure 16:
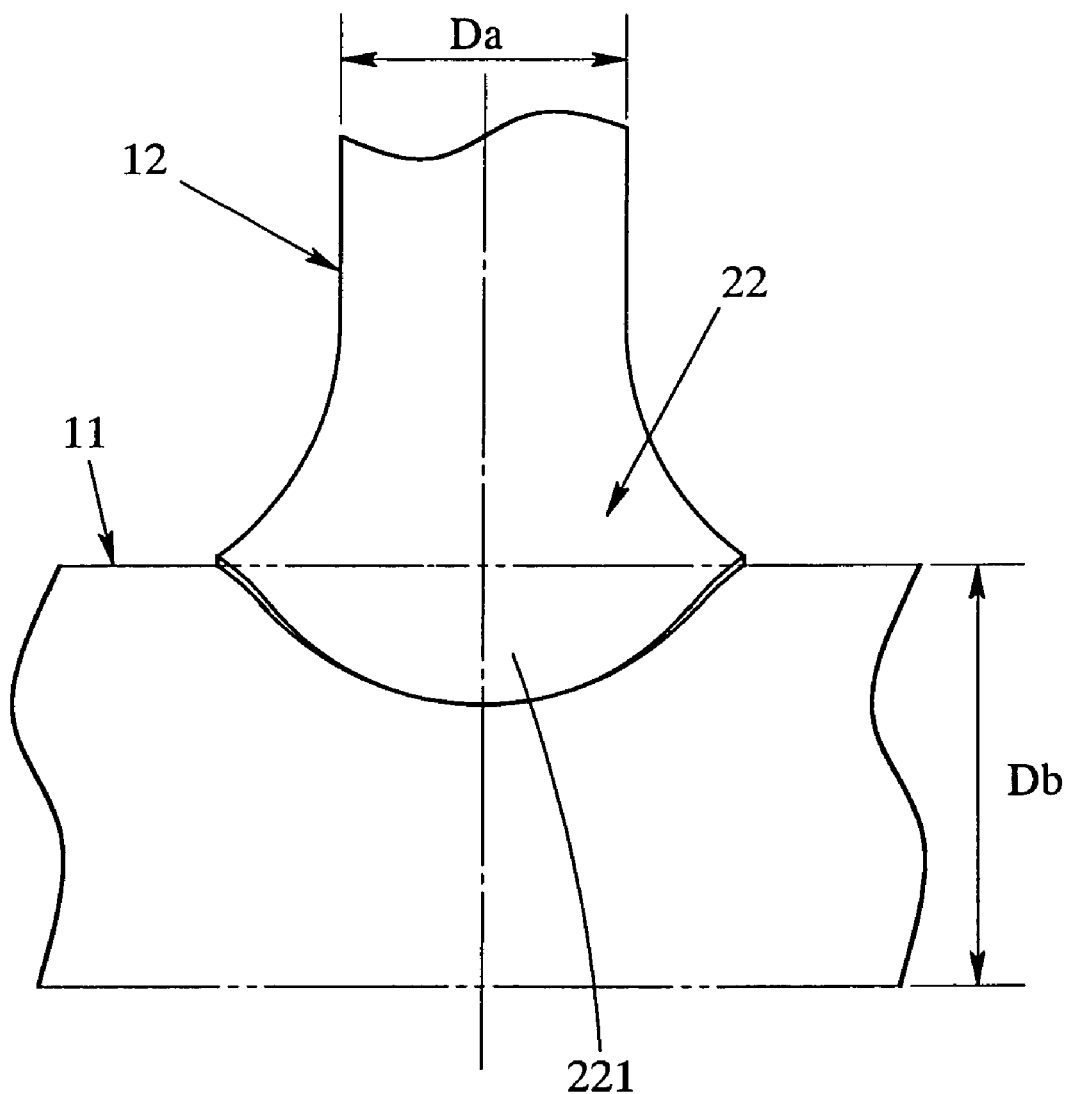
FIG. 16 is a plan view of the joint shown in FIG. 14.

For example, as shown in FIGS. 14 to 16, in case of that the front end cross member 11 is larger than the side member 12, a joint 22 formed at the end portion of the side member 12 may be formed into a cross shape in an front view with an upper flange 221 and a lower flange 222 extending in the orthogonal direction to the extending direction of the front end cross member 11.

Figure 17:
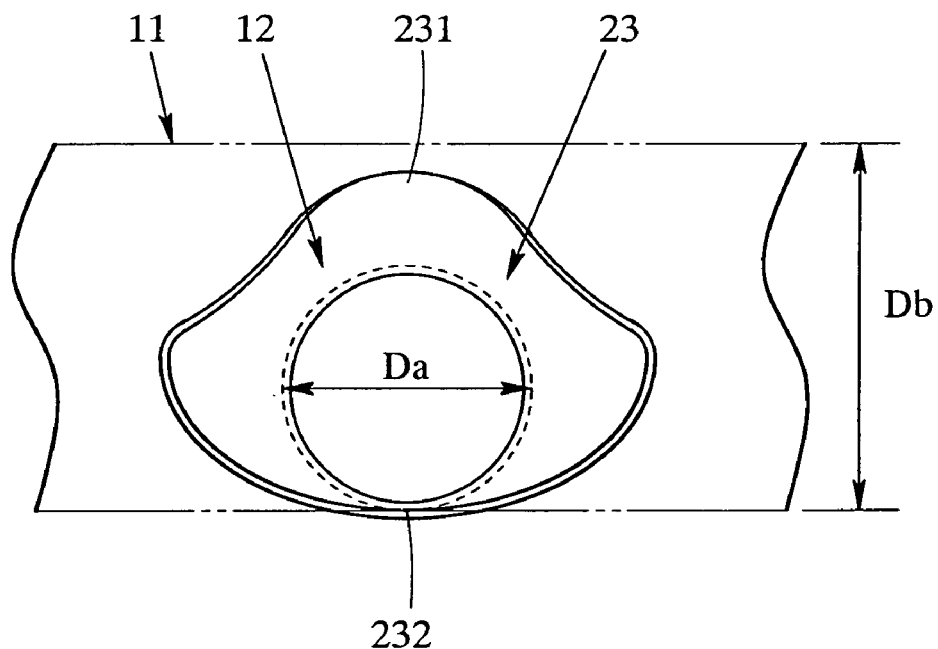
FIG. 17 is a front view of a joint formed at an end portion of a side member joined to a front end cross member with their axes misaligned from each other.
Figure 18:
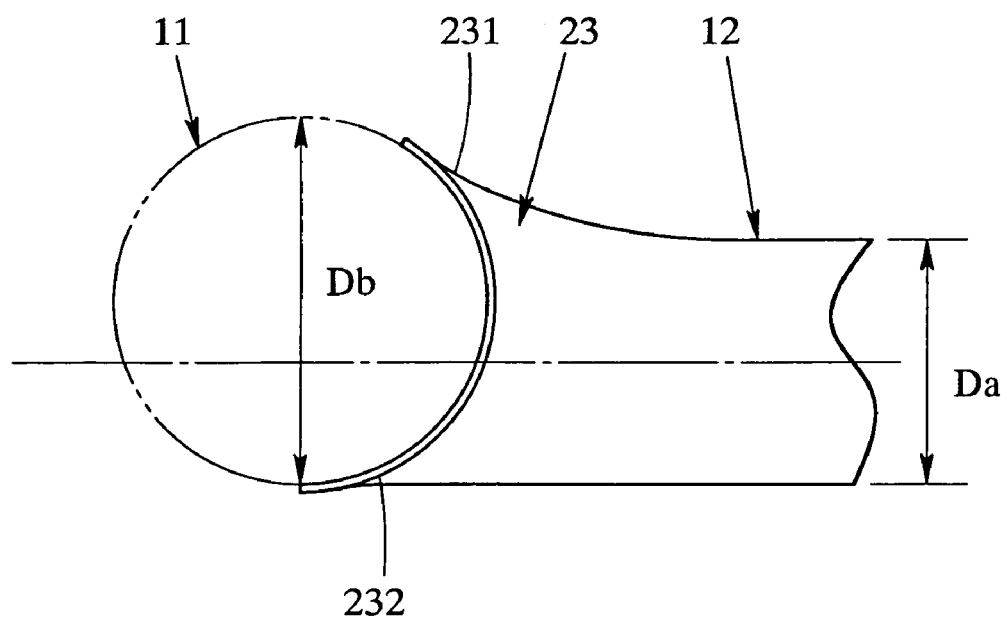
FIG. 18 is a side view of the joint shown in FIG. 17.
Figure 19:
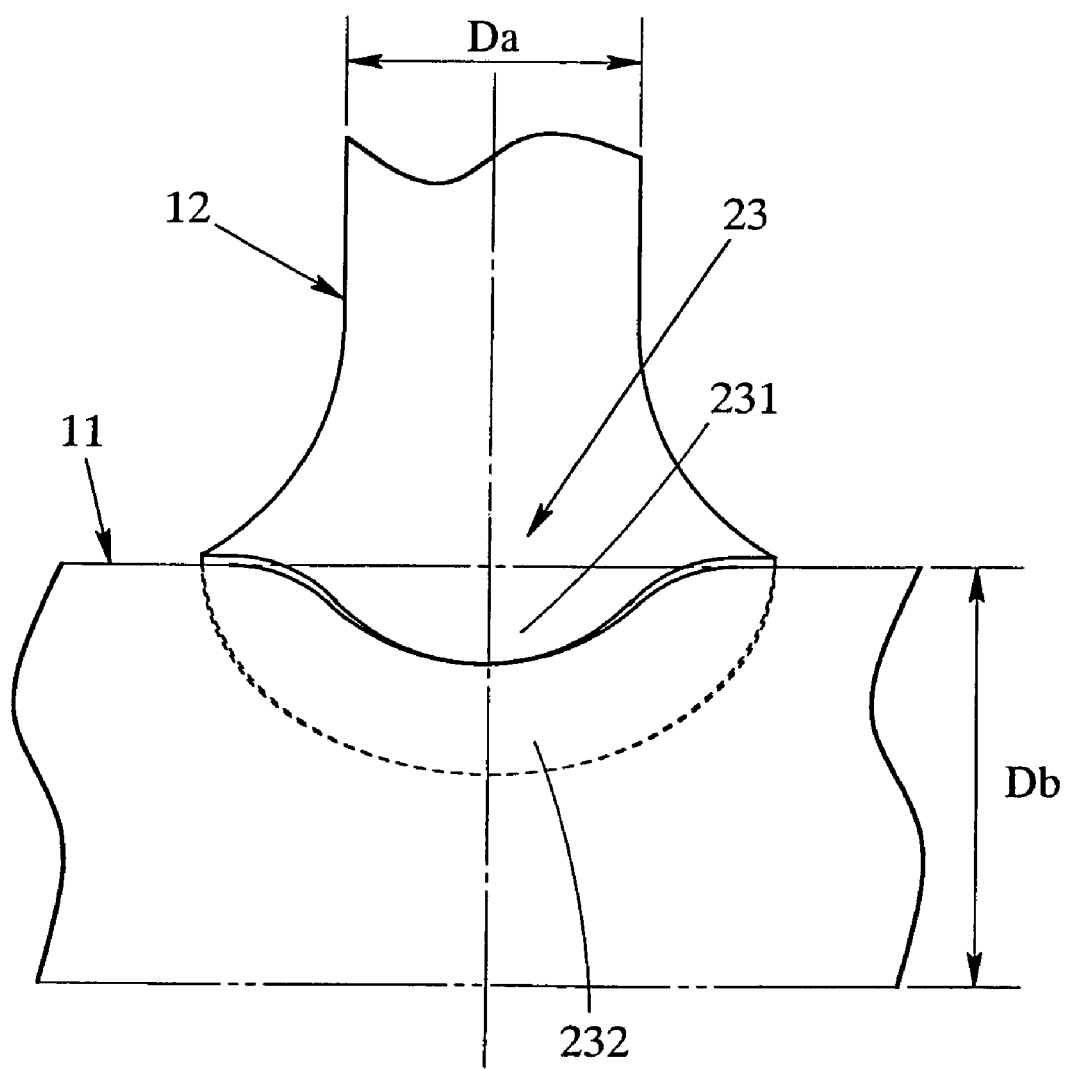
FIG. 19 is a plan view of the joint shown in FIG. 17.

If the front end cross member 11 is larger than the side member 12, as shown in FIGS. 17 to 19, the side member 12 and the front end cross member 11 may be joined to each other with the outer face 121 of the side member and the outer face 111 of the front end cross member aligned with each other, i.e., the side member 12 and the front end cross member 11 may be joined to each other with their axes misaligned from each other. In this case, a joint 23 is asymmetrically formed with an upper flange 231 and a lower flange 232 in the orthogonal direction to the extending direction of the front end cross member 11. In this way, it can tell that the joint 23 functions as an adaptor that accommodates such a misalignment of axes between the front end cross member 11 and the side member 12 to thereby join them each other.

Figure 20:
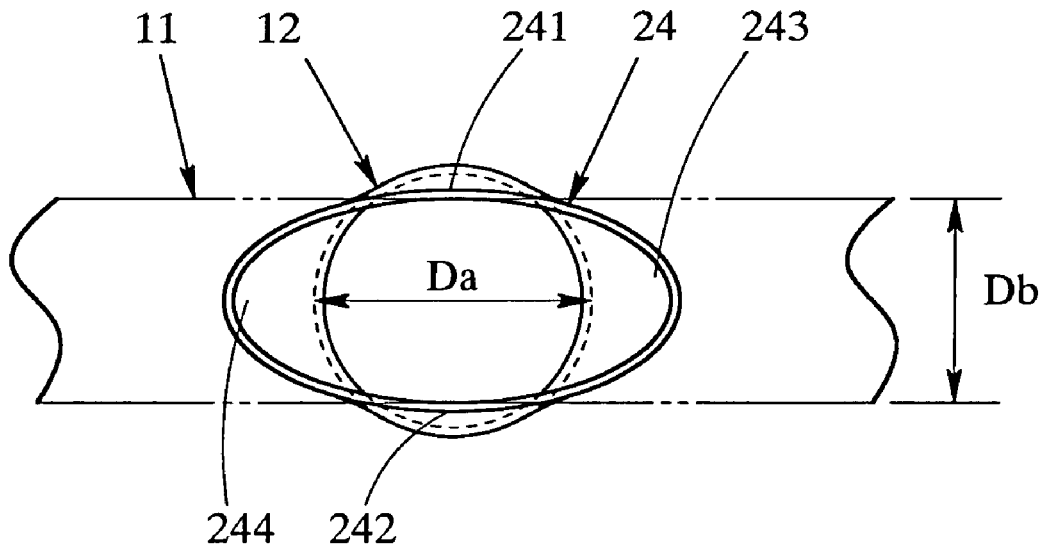
FIG. 20 is a front view of a joint formed at an end portion of a side member joined to an outer face of a relatively small front end cross member.
Figure 21:
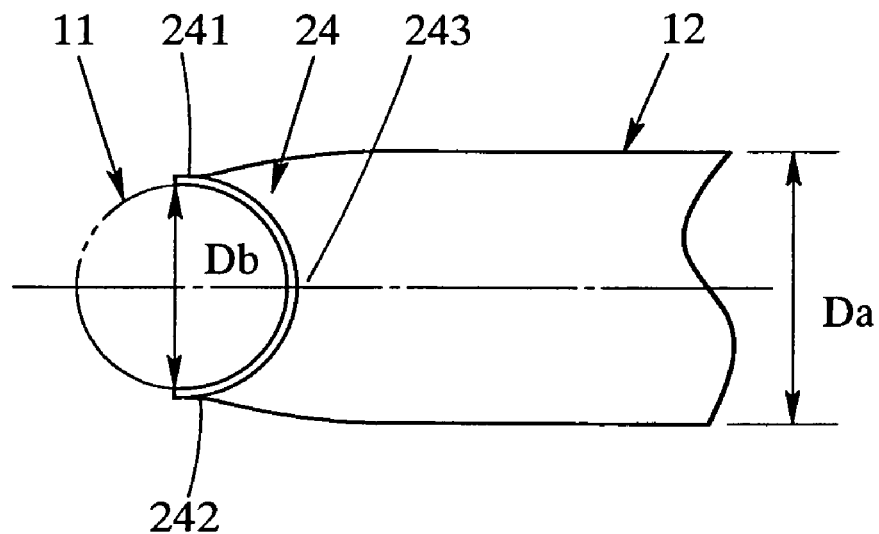
FIG. 21 is a side view of the joint shown in FIG. 20.
Figure 22:
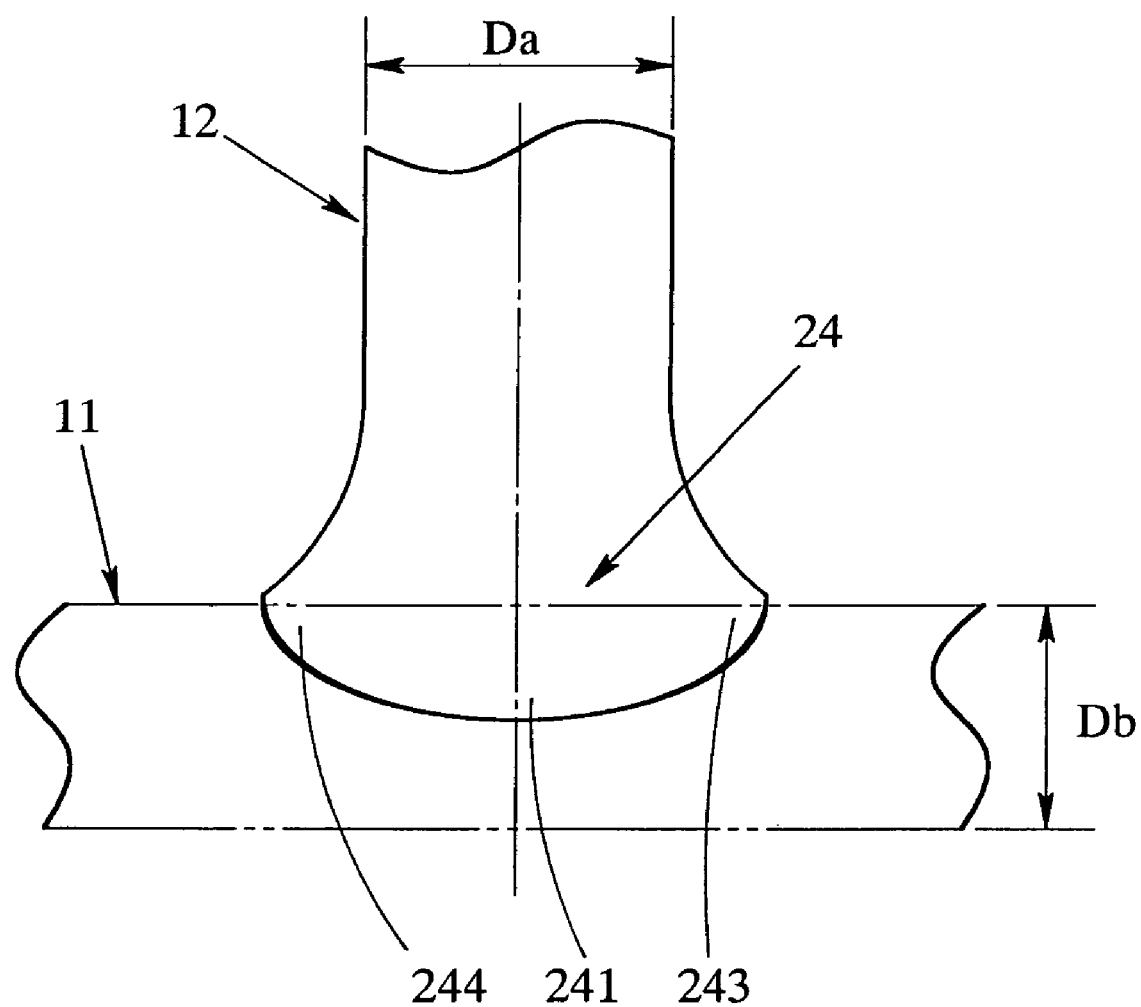
FIG. 22 is a plan view of the joint shown in FIG. 20.

In case of that the front end cross member 11 is smaller than the side member 12, as shown in FIGS. 20 to 22, a joint 24 is formed by narrowing an upper flange 241 and a lower flange 242 at an interval of an outer diameter Db of the front end cross member 11. This joint 24 can be easily formed by plastic deformation carried out by the forming punch expanding a left flange 243 and a right flange 244 and simultaneously narrowing the upper flange 241 and the lower flange 242. This results in reduction in number of members and simplification of manufacturing procedures as compared with the joint in the conventional arts separately using a supporting member and the like.

Figure 23:
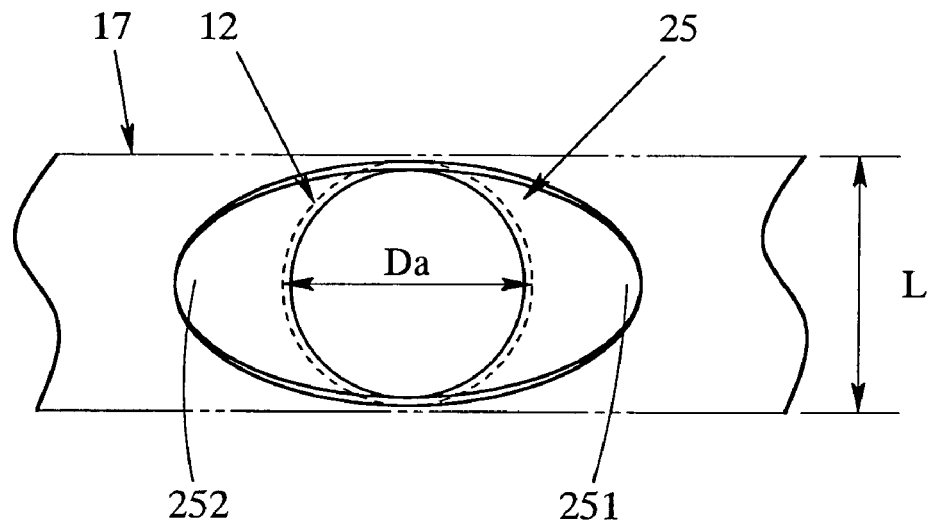
FIG. 23 is a front view of a joint formed at an end portion of a side member joined to an outer face of a front end cross member formed of a pipe having a square sectional shape.
Figure 24:
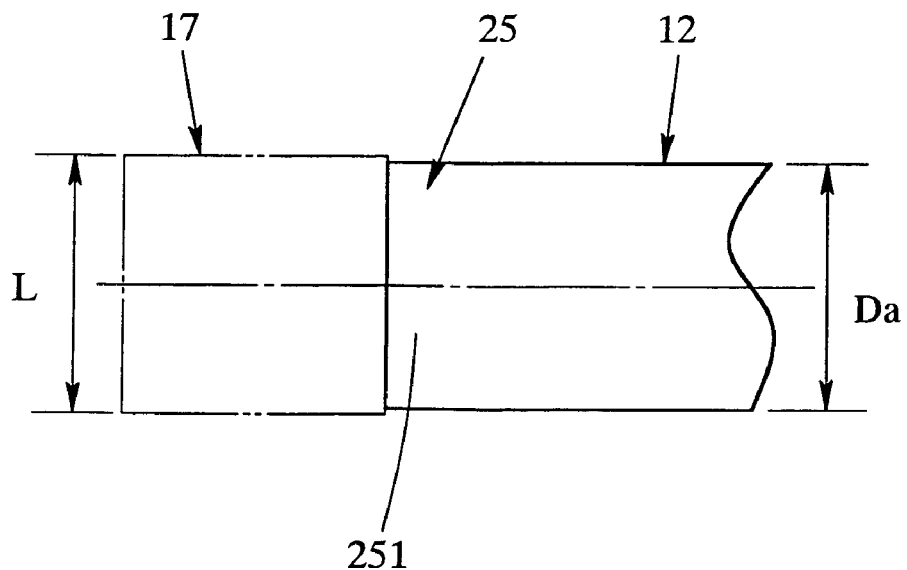
FIG. 24 is a side view of the joint shown in FIG. 23.
Figure 25:
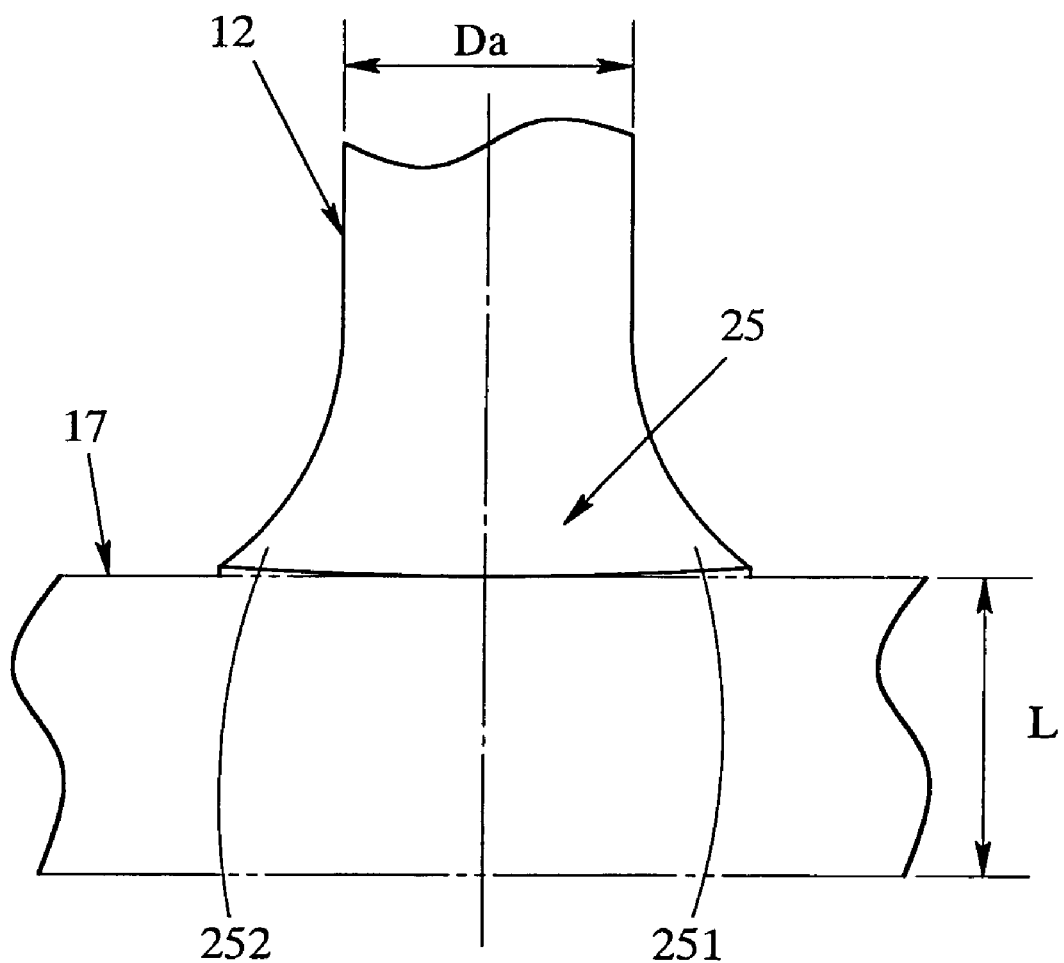
FIG. 25 is a plan view of the joint shown in FIG. 23.

Even the front end cross member as the joined member formed of a pipe having a rectangular sectional shape can be applied to the present invention. For example, as shown in FIGS. 23 to 25, a joint 25 having an elliptic shape in a front view makes the side member 12 formed of a pipe having a circular sectional shape possible to join to a front end cross member 17 formed of a pipe having a square sectional shape with a length L on a side thereof substantially identical to an outer diameter Da of the side member 12. This joint 25 does not have an upper flange and a lower flange. The joint 25 is formed by mainly expanding a left flange 251 and a right flange 252 in the extending direction of the front end cross member 17.

Figure 26:
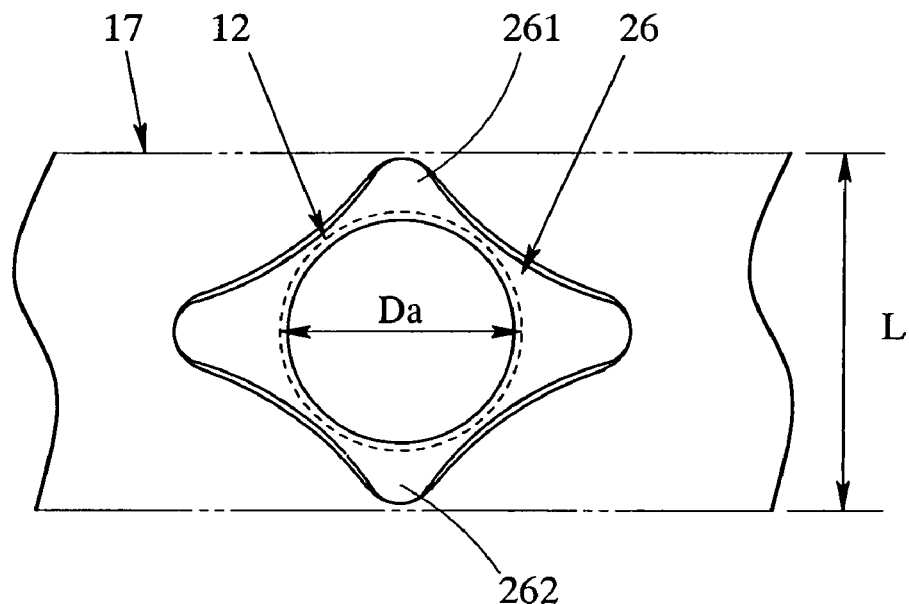
FIG. 26 is a front view of a joint formed at an end portion of a side member joined to an outer face of a relatively large front end cross member formed of a pipe having a square sectional shape.
Figure 27:
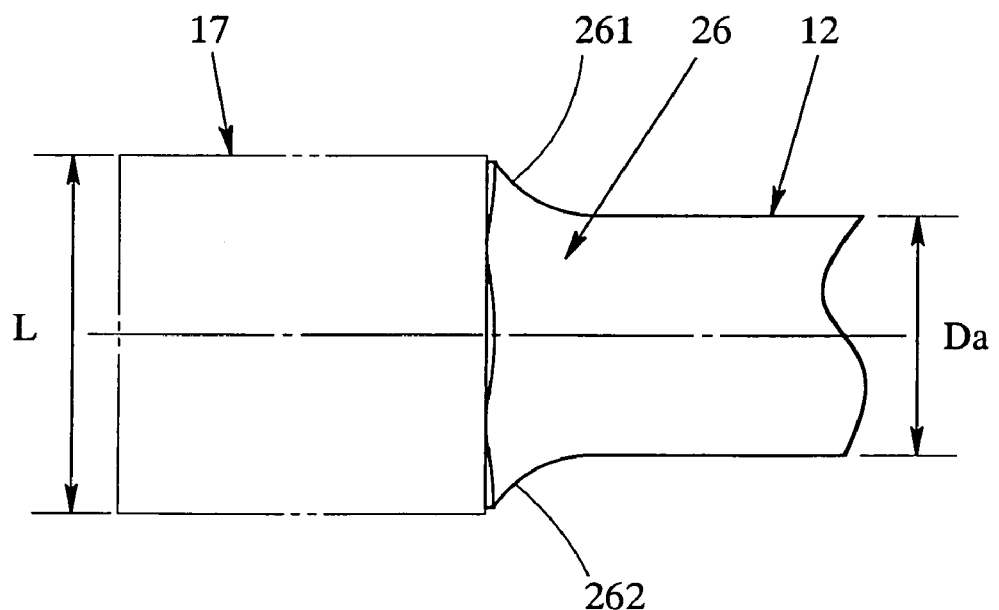
FIG. 27 is a side view of the joint shown in FIG. 26.
Figure 28:
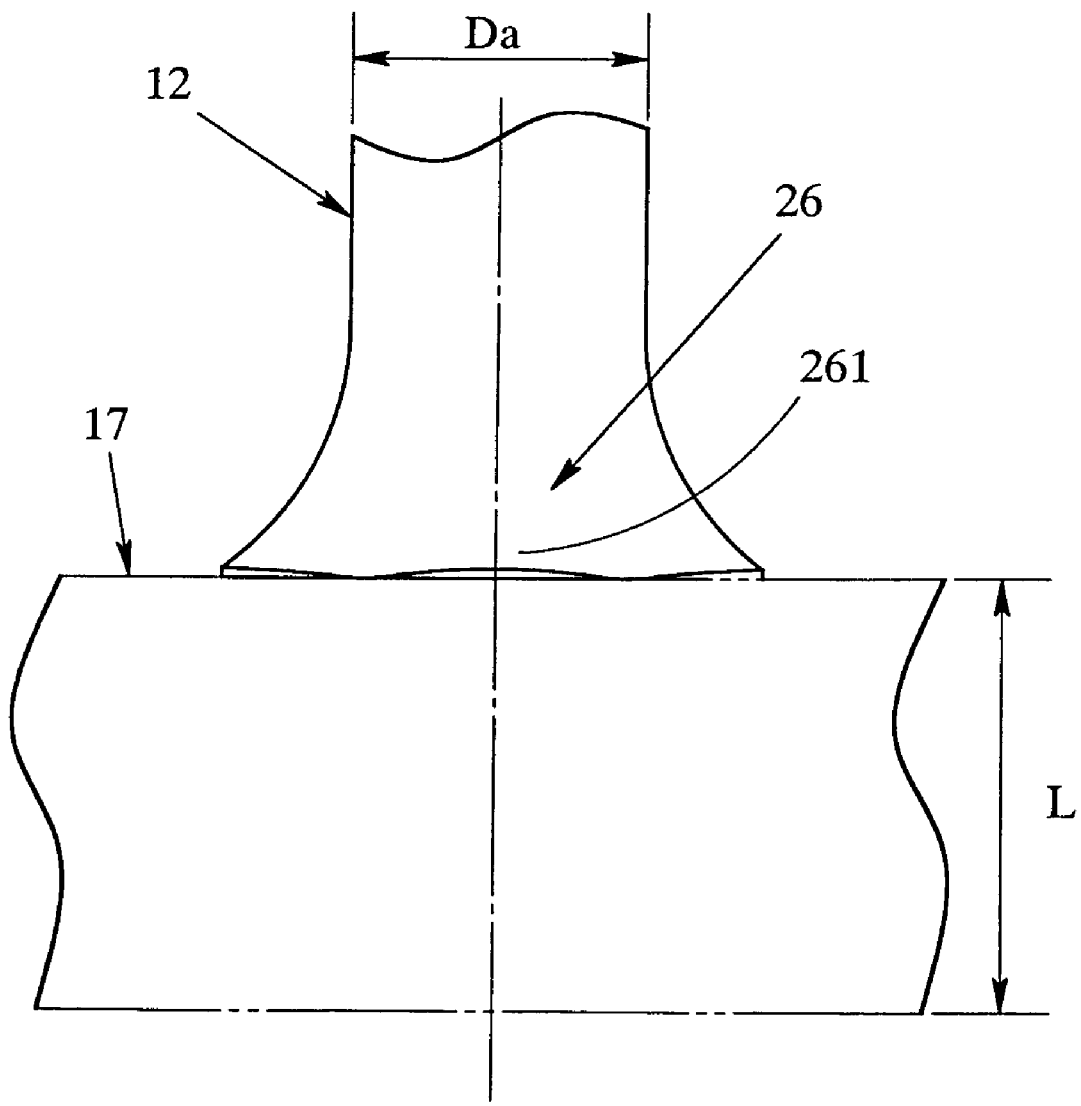
FIG. 28 is a plan view of the joint shown in FIG. 26.

In a case of that a length L on a side of a front end cross member 17 formed of a pipe having a square sectional shape is greater than the outer diameter Da of the side member 12, as shown in FIGS. 26 to 28, a joint 26 having an elliptic shape in a front view makes the side member 12 formed of a pipe having a circular sectional shape possible to joint with the front end cross member 17 by expanding an upper flange 261 and a lower flange 262 in the orthogonal direction to the extending direction of the front end cross member 17.

Figure 29:
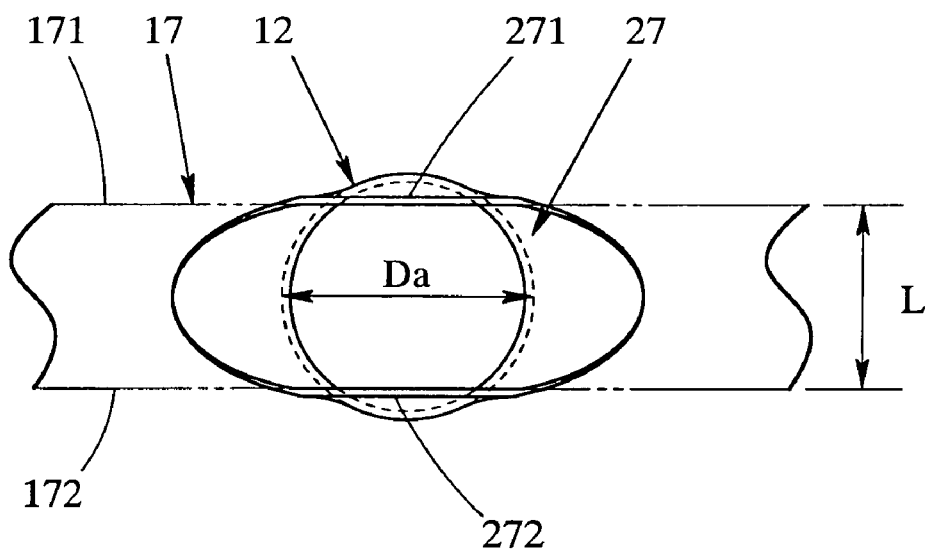
FIG. 29 is a front view of a joint formed at an end portion of a side member joined to an outer face of a relatively small front end cross member formed of a pipe having a square sectional shape.
Figure 30:
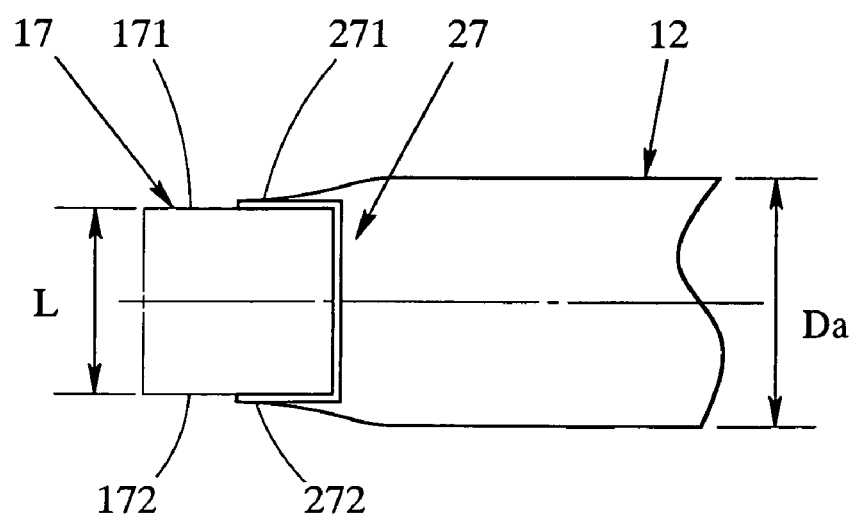
FIG. 30 is a side view of the joint shown in FIG. 29.
Figure 31:
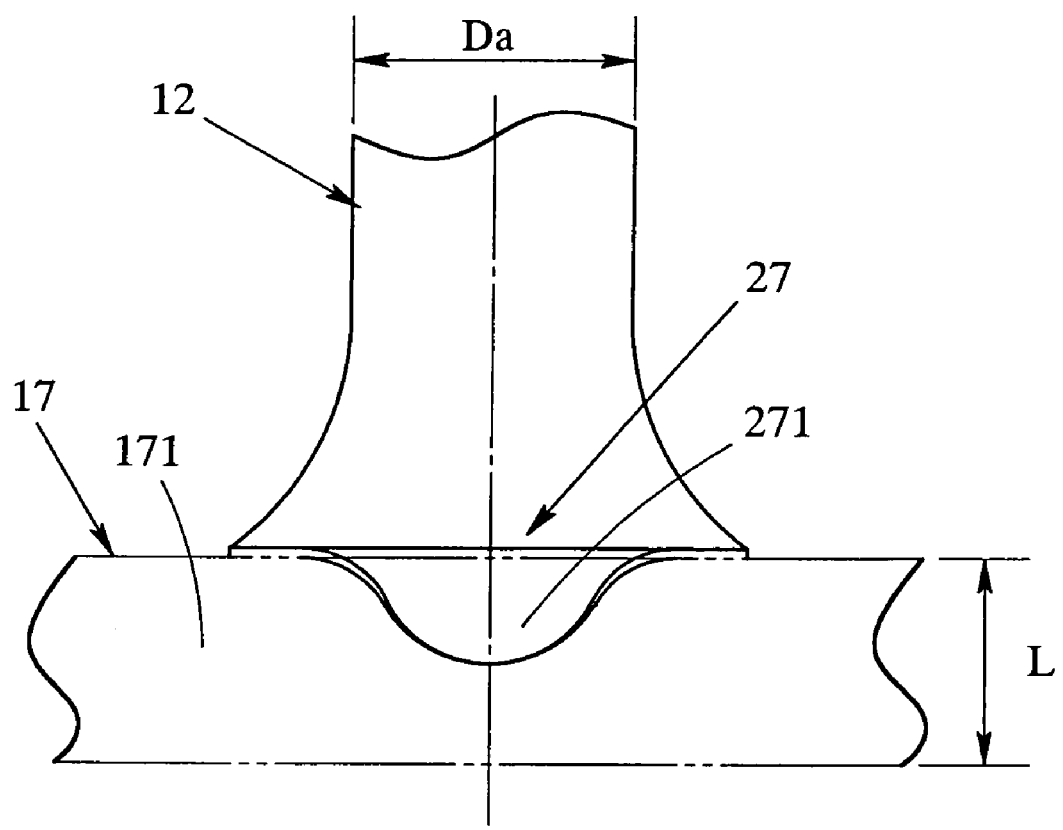
FIG. 31 is a plan view of the joint shown in FIG. 29.

On the other hand, in a case of that a length L on a side of a front end cross member 17 formed of a pipe having a square sectional shape is smaller than the outer diameter Da of the side member 12, as shown in FIGS. 29 to 31, a joint 27 expanded an upper flange 271 and a lower flange 272 in the orthogonal direction to the extending direction of the front end cross member 17 and contacted the upper flange 271 and the lower flange 272 thereof respectively with an upper face 171 and a lower face 172 of the front end cross member 17 makes the side member 12 formed of a pipe having a circular sectional shape possible to joint. It is essential that the joint 27, in a front view, is formed in substantially an ellipse shape excluding the upper flange 271 and the lower flange 272 respectively in contact with the upper face 171 and the lower face 172 of the front end cross member 17.

EXAMPLES

Figure 32:
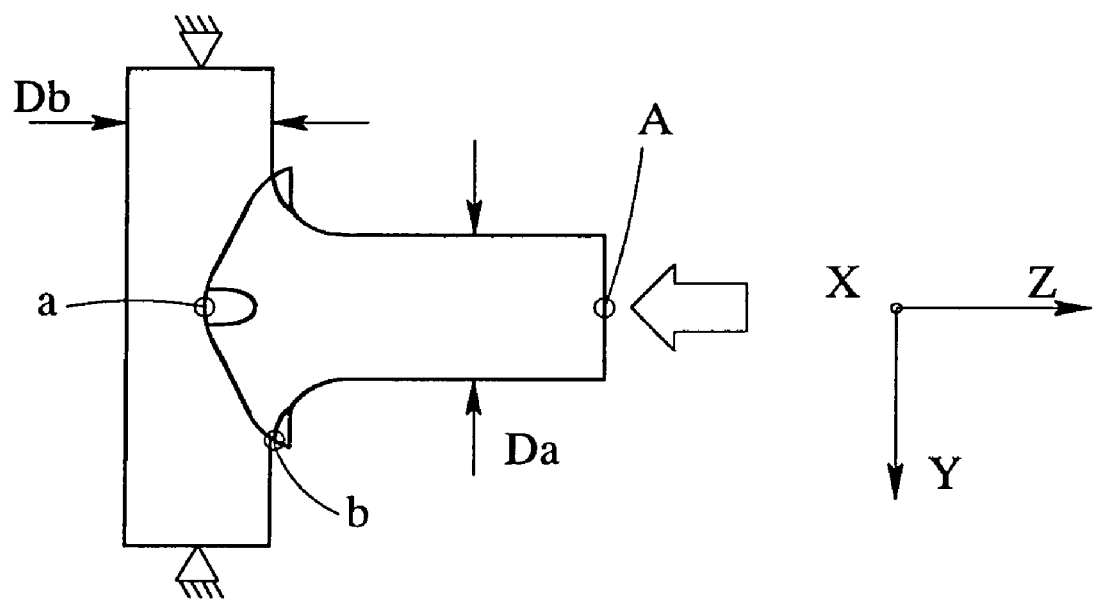
FIG. 32 is a model diagram of an embodiment used for computer analysis.
Figure 32:
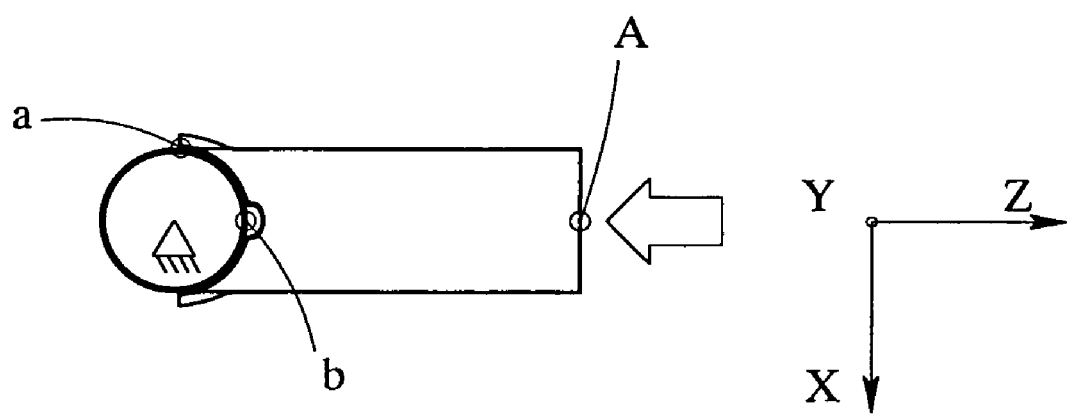
Figure 33:
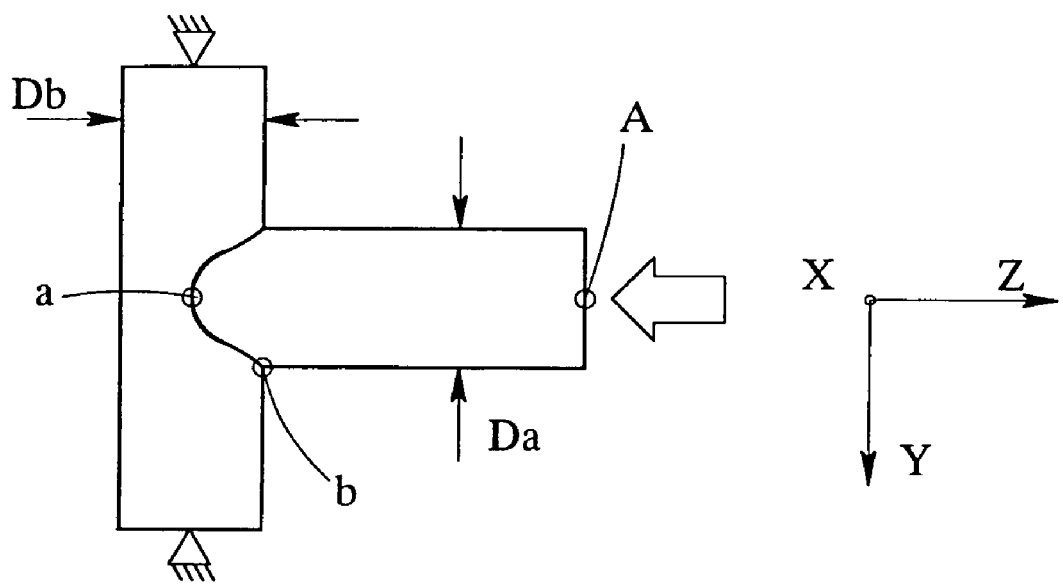
FIG. 33 is a model diagram of a prior art used for computer analysis.
Figure 33:
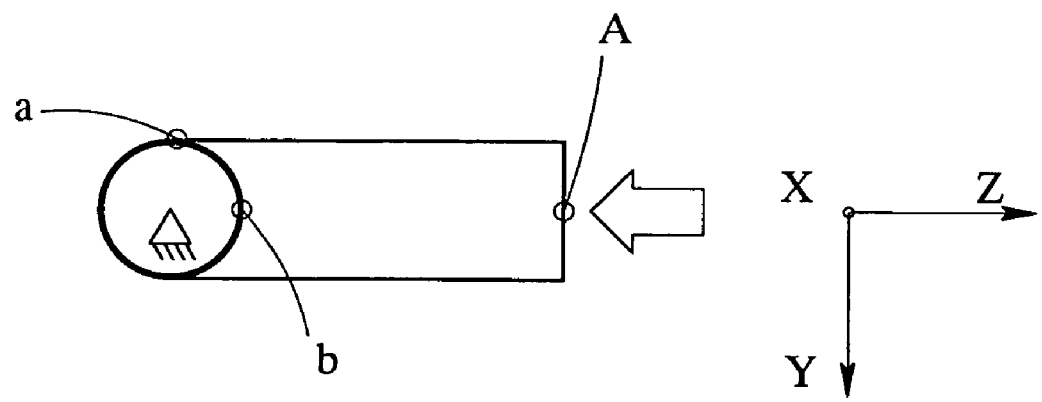

In order to confirm the effectiveness of the joint in the chassis frame according to the present invention, computer analysis for comparing joining strength and rigidity between the conventional art and the embodiment was carried out. The embodiment, as shown in FIG. 32, has a structure in which a joint having an outer edge in a shape following a pattern of an outer face of a joined member is formed at an end portion of a joining member to join the end portion to the outer face of the joined member. The joint has an elliptic shape in a front view with its major axis corresponding to an extending direction of the joined member being 1.8 times of an outer diameter Da of the joining member and with its minor axis being identical to an outer diameter Db of the joined member. The joint also has a smooth curved face extending from an outer face of the joining member to an edge of the joint in a range of a distance 1.2 times of the outer diameter Da of the joining member from the edge of the joining member. The conventional art, as shown in FIG. 33, has a structure in which an end portion of a joining member cut into a shape following a pattern of an outer face of a joined member is joined to the outer face of the joined member.

Analysis conditions other than the above mentioned structures were the same between the conventional art and the embodiment. First, both the joining member and joined member were carbon steel pipes (the pipe having a circular sectional shape) having outer diameters Da and Db of 60 mm and thicknesses of 2.0 mm, a length of the joined member was 200 mm, a length of the joining member was 170 mm from an axis of the joined member in a state where the joining member was joined to the joined member, and the joining member was joined to be orthogonal to a middle point of the joined member. In each model of the embodiment and the conventional art, while completely holding opposite ends (upper and lower ends in each drawing) of the joined member and gradually increasing a load applied on a point A of the joining member: an open end (right end of the joining member shown in each drawing), peak values of stress generated at a point a and a point b in each drawing and an amount of displacement at the point A were respectively calculated.

Results of the computer analyses are shown in the Table 1.

TABLE 1

|  |  | Bending load (Direction X) | | | Bending Load (Direction Y) | | | Tensile Load (Direction Z) | | |
|---|---|---|---|---|---|---|---|---|---|---|
|  |  | Embodiment | Conventional Art | Effect | Embodiment | Conventional Art | Effect | Embodiment | Conventional Art | Effect |
| Generated Stress Peak Value (Mpa) | Point a | 316.8 | 466.8 | Δ 32% | — | — | — | 27.9 | 32.1 | Δ 13% |
|  | Point b | — | — | — | 135.3 | 250.5 | Δ 46% | — | — | — |
| Amount of Displacement at Loading Point (mm) |  | 0.72 | 0.84 | Δ 14% | 0.021 | 0.024 | Δ 13% | 0.48 | 0.27 | Δ 44% |

The peak value of the stress generated by a bending load (shown as a direction X) in the embodiment was 32% smaller than that in the conventional art. And, the peak value of the stress generated by the bending load (shown as a direction Y) in the embodiment was 46% smaller than that in the conventional art. This indicates that the embodiment has higher rigidity than the conventional art and can resist a greater load. Further, the peak value of the stress generated by a tensile load (shown as a direction Z) in the embodiment was 13% smaller than that in the conventional art. This indicates that the embodiment has higher joining strength than the conventional art.

Improvement of the joining strength and rigidity as described above can also be confirmed by an amount of displacement amount at a loading point when each load is applied. That is, an amount of displacement in the embodiment at the time of applying the bending load (in the direction X) was 14% smaller than that in the conventional art, and an amount of displacement in the embodiment at the time of applying the bending load (in the direction Y) was 13% smaller than that in the conventional art. Furthermore, an amount of displacement in the embodiment at the time of applying the tensile load (in the direction Z) was 44% smaller than that in the conventional art. Especially, an amount of the displacement in the embodiment at the time of applying the tensile load is much smaller than that in the conventional art, which translates that the joining member was firmly joined to the joined member, i.e., translates improvement of the joining strength.

From these computer analyses, it can tell that the chassis frame according to the present invention is excellent in the joining strength and rigidity of the joining member and the joined member, and that the engine can be mounted or the wheels can be supported through the suspension systems thereon more stably.

According to the present invention, it is possible to provide a chassis frame in which the joining member and the joined member are joined to each other with high joining strength and rigidity without requiring an auxiliary member. This brings an effect of reducing number of members in the chassis frame. The reduction in number of members brings an effect of reducing number of process steps and the cost of manufacturing.

For example, if a joint formed at the end portion of the side member to be brought into abutting contact with the outer face of the front end cross member is bilaterally and vertically symmetrical, it can move a pair of right and left side members to a common structure, and thereby to advantageously increase productivity thereof.

The joining operation itself is only welding of the joint while bringing the joining member into abutting contact with the outer face of the joined member, which does not increase the number of process steps or largely change the operation. Moreover, since no opening hole or the like for joining the end portion of the joining member to the outer face of the joined member is required, there is no possibility that structural strength of the joined member itself is reduced in the chassis frame according to the invention.

The joint that is characteristic of the present invention is formed only by expanding the end portion of the joining member by utilizing plastic forming by a simple forming punch. This means not only that the joint is easily formed but also that cutting procedures of the end portion of the joining member to be joined to the joined member by the laser or the like becomes unnecessary. As a result, the cost of manufacturing can be reduced.

Furthermore, because the outer edge of the joint formed by plastic deformation by utilizing the above forming punch can surely be brought into contact with the outer face of the joined member, welding of the outer edge can be evenly finished. As a result, the problem of poor durability at the welded portion laid in the conventional arts is never raised by the joint according to the present invention.

As described above, the present invention provides a technology that satisfies demands in performance required as a chassis frame, even though a small number of members and a simple structure are employed.

What is claimed is:

1. An octothorp-shaped chassis frame formed by joining an end portion of a joining member in abutting contact with an outer face of a joined member, wherein
    the joining member is formed of a hollow pipe, the end portion of the joining member is gradually expanded at least in extending direction of the joined member to form a joint made integrally with the joining member and expanded in a flared skirt shape, and an outer edge of the joint is brought into contact with and welded to the outer face of the joined member to join the joining member to the outer face of the joined member.

2. The chassis frame according to claim 1, wherein the joining member is a side member and the joined member is an end cross member.

3. The chassis frame according to claim 1, wherein the joining member is a cross member and the joined member is a side member.

4. The chassis frame according to claim 1, wherein both the joining member and joined member are formed of pipes having circular sectional shapes and the outer edge of the joint is substantially in a circular arc shape following a pattern of the outer face of the joined member in a side view.

5. The chassis frame according to claim 1, wherein the joining member is a pipe having a circular sectional shape, the joined member is a pipe having a rectangular sectional shape, and the outer edge of the joint is substantially in a linear shape following a pattern of the outer face of the joined member in a side view.

6. The chassis frame according to claim 1, wherein the outer edge of the joint is in a shape following a pattern of the outer face of the joined member in a side view and is in an elliptic shape having a diameter in an extending direction of the joined member greater than that of a diameter in an orthogonal direction to the extending direction of the joined member in a front view.

7. The chassis frame according to claim 1, wherein the outer edge of the joint is in a shape following a pattern of the outer face of the joined member in a side view, and is in a cross shape respectively extending in an extending direction of the joined member and in an orthogonal direction to the extending direction of the joined member in a front view.

8. The chassis frame according to claim 1, wherein the joint is symmetric respectively in an extending direction of the joined member and in an orthogonal direction to the extending direction of the joined member with respect to an axial direction of the joining member.

9. The chassis frame according to claim 1, wherein the joining member is joined in abutting contact with the outer face of the joined member to be orthogonal with respect to the outer face thereof in a plan view and a side view.

10. The chassis frame according to claim 1, wherein the joining member is joined in abutting contact with the outer face of the joined member to be oblique with respect to the outer face thereof in a plan view.

11. The chassis frame according to claim 1, wherein the joining member is joined in abutting contact with the outer face of the joined member to be oblique with respect to the outer face thereof in a side view.

12. The chassis frame according to claim 1, wherein each joint is provided with a swelling rib forming a groove recessed from the outer face of the joined member.

13. A method of manufacturing an octothorp-shaped chassis frame formed by joining an end portion of a joining member formed of a hollow pipe in abutting contact with an outer face of a joined member, wherein
    the joining member joins to the outer face of the joined member by welding an outer edge of a flared-skirt-shaped joint made integrally with the joining member and formed at the end portion of the joining member by bringing into contact with the outer face of the joined member;
    the flared-skirt-shaped joint formed at the end portion of the joining member is formed, using a forming punch comprising a base portion having a surface following a pattern of the outer face of the joined member, and a flared-skirt-shaped protruding portion protruding from the base portion in a protruding direction aligned with a direction in which the joining member joins to the joined member, by pushing the flared-skirt-shaped protruding portion of the forming punch into the end portion of the position-fixed joining member by aligning the protruding direction of the flared-skirt-shaped protruding portion with an axial direction of the joining member, to expand the end portion of the joining member by the flared-skirt-shaped protruding portion;

the protruding portion is a substantially truncated cone shape including an upper end face having a shape identical to an inside shape of the joining member, a lower end face having an outer edge having a shape following a pattern of the surface of the base portion in a side view, and a curved face connecting the upper end face and the lower end face; and said outer edge of the lower end face in a front view is in a shape at least larger in an extending direction than an outer diameter of the upper end face in the extending direction.

14. The method of manufacturing a chassis frame according to claim 13, wherein the outer edge in a front view in an elliptic shape having a major axis in an extending direction of the joined member and a minor axis in the orthogonal direction to the extending direction of the joined member.

15. The method of manufacturing a chassis frame according to claim 13, wherein the outer edge in a front view having a cross shape extending respectively in an extending direction and in an orthogonal direction to the extending direction of the joined member.

* * * * *